(12) United States Patent
Jacobson et al.

(10) Patent No.: US 9,514,466 B2
(45) Date of Patent: Dec. 6, 2016

(54) COLLECTING AND PRESENTING DATA INCLUDING LINKS FROM COMMUNICATIONS SENT TO OR FROM A USER

(75) Inventors: Joshua Robert Russell Jacobson, San Francisco, CA (US); Gregory Garland Thatcher, San Francisco, CA (US); Brian Tadao Kobashikawa, San Francisco, CA (US); Robin Andrew Radez, Fremont, CA (US); Frank J. Cort, Dublin, CA (US)

(73) Assignee: Yahoo! Inc., Sunnyvale, CA (US)

( * ) Notice: Subject to any disclaimer, the term of this patent is extended or adjusted under 35 U.S.C. 154(b) by 217 days.

(21) Appl. No.: 12/944,650

(22) Filed: Nov. 11, 2010

(65) Prior Publication Data

US 2011/0119593 A1  May 19, 2011

Related U.S. Application Data

(60) Provisional application No. 61/261,680, filed on Nov. 16, 2009.

(51) Int. Cl.
*G06F 3/00* (2006.01)
*G06Q 30/02* (2012.01)
*G06F 3/01* (2006.01)

(52) U.S. Cl.
CPC .................................... *G06Q 30/02* (2013.01)

(58) Field of Classification Search
USPC ........ 715/736, 205, 841, 787, 788, 786, 748
See application file for complete search history.

(56) References Cited

U.S. PATENT DOCUMENTS

| | | | |
|---|---|---|---|
| 5,396,647 | A | 3/1995 | Thompson et al. |
| 5,610,915 | A | 3/1997 | Elliott et al. |
| 5,966,714 | A | 10/1999 | Huang et al. |
| 6,020,884 | A | 2/2000 | MacNaughton et al. |
| 6,154,205 | A | 11/2000 | Carroll et al. |
| 6,285,999 | B1 | 9/2001 | Page |
| 6,385,644 | B1 | 5/2002 | Devine et al. |
| 6,484,196 | B1 | 11/2002 | Maurille |

(Continued)

FOREIGN PATENT DOCUMENTS

| | | |
|---|---|---|
| EP | 0944002 | 9/1999 |
| JP | 2003006116 | 1/2003 |

(Continued)

OTHER PUBLICATIONS

International Patent Application PCT/US10/56560, International Search Report and Written Opinion, Jun. 21, 2011.

(Continued)

*Primary Examiner* — Toan Vu
(74) *Attorney, Agent, or Firm* — James J. DeCarlo; Greenberg Traurig LLP

(57) ABSTRACT

Information is presented to a user of a user device by a method including: collecting data relating to communications sent to or from the user, including to or from a first person, each communication including a link of a plurality of links; generating personal profiles from the collected data, the profiles comprising a first personal profile of the first person and including a first link of the plurality of links; and presenting the first personal profile to the user, comprising displaying the first link in a user interface on the user device.

12 Claims, 10 Drawing Sheets

(56) References Cited

U.S. PATENT DOCUMENTS

| | | |
|---|---|---|
| 6,510,453 B1 | 1/2003 | Apfel et al. |
| 6,546,393 B1* | 4/2003 | Khan |
| 6,560,620 B1 | 5/2003 | Ching |
| 6,594,654 B1* | 7/2003 | Salam et al. |
| 6,721,748 B1 | 4/2004 | Knight et al. |
| 6,931,419 B1 | 8/2005 | Lindquist |
| 6,952,805 B1 | 10/2005 | Tafoya et al. |
| 6,996,777 B2 | 2/2006 | Hiipakka |
| 7,003,724 B2 | 2/2006 | Newman |
| 7,058,892 B1 | 6/2006 | MacNaughton et al. |
| 7,076,533 B1 | 7/2006 | Knox et al. |
| 7,085,745 B2 | 8/2006 | Klug |
| 7,103,806 B1 | 9/2006 | Horvitz |
| 7,181,518 B1 | 2/2007 | Matsumoto et al. |
| 7,185,065 B1 | 2/2007 | Holtzman et al. |
| 7,237,009 B1* | 6/2007 | Fung et al. ............ 709/206 |
| 7,246,045 B1 | 7/2007 | Rappaport et al. |
| 7,328,242 B1 | 2/2008 | McCarthy et al. |
| 7,359,894 B1 | 4/2008 | Liebman et al. |
| 7,383,307 B2 | 6/2008 | Kirkland et al. |
| 7,444,323 B2 | 10/2008 | Martinez et al. |
| 7,475,109 B1 | 1/2009 | Fletcher et al. |
| 7,475,113 B2 | 1/2009 | Stolze |
| 7,512,788 B2 | 3/2009 | Choi et al. |
| 7,512,814 B2 | 3/2009 | Chen et al. |
| 7,536,384 B2 | 5/2009 | Venkataraman et al. |
| 7,539,676 B2 | 5/2009 | Aravamudan |
| 7,580,363 B2 | 8/2009 | Sorvari et al. |
| 7,593,995 B1 | 9/2009 | He et al. |
| 7,620,407 B1 | 11/2009 | Donald et al. |
| 7,624,103 B2 | 11/2009 | Wiegering et al. |
| 7,627,598 B1 | 12/2009 | Burke |
| 7,634,463 B1 | 12/2009 | Katragadda et al. |
| 7,639,157 B1 | 12/2009 | Whitley et al. |
| 7,653,695 B2 | 1/2010 | Flury et al. |
| 7,692,653 B1 | 4/2010 | Petro et al. |
| 7,702,730 B2 | 4/2010 | Spataro et al. |
| 7,707,249 B2 | 4/2010 | Spataro et al. |
| 7,707,509 B2 | 4/2010 | Naono et al. |
| 7,716,140 B1 | 5/2010 | Nielsen et al. |
| 7,720,916 B2 | 5/2010 | Fisher et al. |
| 7,725,492 B2 | 5/2010 | Sittig |
| 7,730,010 B2* | 6/2010 | Kishore et al. ............ 707/783 |
| 7,743,051 B1 | 6/2010 | Kashyap et al. |
| 7,752,081 B2 | 7/2010 | Calabria |
| 7,756,895 B1 | 7/2010 | Emigh |
| 7,756,935 B2 | 7/2010 | Gaucas |
| 7,761,436 B2 | 7/2010 | Norton et al. |
| 7,788,260 B2 | 8/2010 | Lunt |
| 7,805,492 B1 | 9/2010 | Thatcher |
| 7,818,396 B2 | 10/2010 | Dolin et al. |
| 7,827,208 B2 | 11/2010 | Bosworth |
| 7,827,265 B2 | 11/2010 | Cheever et al. |
| 7,831,676 B1* | 11/2010 | Nagar .......... G06Q 10/107 709/203 |
| 7,831,692 B2 | 11/2010 | French et al. |
| 7,836,045 B2 | 11/2010 | Schachter |
| 7,836,132 B2* | 11/2010 | Qureshi et al. ............ 709/206 |
| 7,836,134 B2 | 11/2010 | Pantalone |
| 7,849,141 B1 | 12/2010 | Bellegarda et al. |
| 7,849,142 B2 | 12/2010 | Clegg et al. |
| 7,853,602 B2 | 12/2010 | Gorti et al. |
| 7,853,881 B1 | 12/2010 | Aly Assal et al. |
| 7,870,197 B2 | 1/2011 | Lewis et al. |
| 7,899,806 B2 | 3/2011 | Aravamudan |
| 7,899,871 B1 | 3/2011 | Kumar et al. |
| 7,908,647 B1 | 3/2011 | Polis et al. |
| 7,930,430 B2 | 4/2011 | Thatcher et al. |
| 7,949,627 B2 | 5/2011 | Aravamudan |
| 7,970,832 B2 | 6/2011 | Perry, Jr. et al. |
| 7,979,569 B2 | 7/2011 | Eisner et al. |
| 7,991,764 B2 | 8/2011 | Rathod |
| 7,996,456 B2 | 8/2011 | Gross |
| 8,005,806 B2 | 8/2011 | Rupp et al. |
| 8,028,032 B2* | 9/2011 | Laird-McConnell ......... 709/206 |
| 8,055,715 B2 | 11/2011 | Bensky et al. |
| 8,073,928 B2 | 12/2011 | Dolin et al. |
| 8,086,676 B2 | 12/2011 | Palahnuk et al. |
| 8,140,566 B2 | 3/2012 | Boerries et al. |
| 8,145,791 B2 | 3/2012 | Thatcher et al. |
| 8,151,358 B1 | 4/2012 | Herold |
| 8,161,122 B2 | 4/2012 | Sood et al. |
| 8,200,761 B1 | 6/2012 | Tevanian |
| 8,200,808 B2 | 6/2012 | Ishida |
| 8,204,897 B1* | 6/2012 | Djabarov et al. ............ 707/767 |
| 8,284,783 B1 | 10/2012 | Maufer et al. |
| 8,291,019 B1 | 10/2012 | Rochelle et al. |
| 8,316,315 B2 | 11/2012 | Portnoy et al. |
| 8,392,409 B1 | 3/2013 | Kashyap et al. |
| 8,423,545 B2 | 4/2013 | Cort et al. |
| 8,443,441 B2 | 5/2013 | Stolfo et al. |
| 8,463,872 B2 | 6/2013 | Pounds et al. |
| 8,468,168 B2 | 6/2013 | Brezina et al. |
| 8,495,045 B2 | 7/2013 | Wolf et al. |
| 8,510,389 B1 | 8/2013 | Gurajada et al. |
| 8,522,257 B2 | 8/2013 | Rupp et al. |
| 8,549,412 B2 | 10/2013 | Brezina et al. |
| 8,600,343 B2 | 12/2013 | Brezina et al. |
| 8,620,935 B2 | 12/2013 | Rubin et al. |
| 8,661,002 B2 | 2/2014 | Smith et al. |
| 8,717,933 B2* | 5/2014 | Fisher .............. H04L 45/00 370/254 |
| 8,745,060 B2 | 6/2014 | Brezina et al. |
| 8,754,848 B2 | 6/2014 | Holzer et al. |
| 8,793,625 B2 | 7/2014 | Rhee et al. |
| 8,819,234 B1* | 8/2014 | Bauer .............. H04L 41/5058 707/609 |
| 8,850,343 B2* | 9/2014 | Klassen .......... G01C 21/3682 715/764 |
| 8,982,053 B2 | 3/2015 | Holzer et al. |
| 9,020,938 B2 | 4/2015 | Cort et al. |
| 9,058,366 B2 | 6/2015 | Brezina et al. |
| 9,275,118 B2 | 3/2016 | Brezina et al. |
| 9,275,126 B2 | 3/2016 | Smith et al. |
| 9,298,783 B2 | 3/2016 | Brezina et al. |
| 2001/0022792 A1* | 9/2001 | Maeno et al. ............ 370/521 |
| 2001/0037407 A1 | 11/2001 | Dragulev et al. |
| 2001/0049628 A1 | 12/2001 | Icho |
| 2002/0016818 A1 | 2/2002 | Kirani et al. |
| 2002/0024536 A1 | 2/2002 | Kahan et al. |
| 2002/0049751 A1 | 4/2002 | Chen et al. |
| 2002/0054587 A1 | 5/2002 | Baker et al. |
| 2002/0059402 A1 | 5/2002 | Belanger |
| 2002/0059418 A1 | 5/2002 | Bird et al. |
| 2002/0059425 A1 | 5/2002 | Belfiore et al. |
| 2002/0073011 A1 | 6/2002 | Brattain et al. |
| 2002/0076004 A1 | 6/2002 | Brockenbrough et al. |
| 2002/0087647 A1 | 7/2002 | Quine et al. |
| 2002/0091777 A1 | 7/2002 | Schwartz |
| 2002/0103873 A1 | 8/2002 | Ramanathan et al. |
| 2002/0103879 A1 | 8/2002 | Mondragon |
| 2002/0107991 A1 | 8/2002 | Maguire et al. |
| 2002/0116396 A1 | 8/2002 | Somers et al. |
| 2002/0143871 A1 | 10/2002 | Meyer et al. |
| 2002/0163539 A1 | 11/2002 | Srinivasan |
| 2002/0194502 A1 | 12/2002 | Sheth et al. |
| 2003/0028525 A1 | 2/2003 | Santos et al. |
| 2003/0037116 A1 | 2/2003 | Nolan et al. |
| 2003/0093483 A1 | 5/2003 | Allen et al. |
| 2003/0114171 A1* | 6/2003 | Miyamoto ............ 455/456 |
| 2003/0114956 A1 | 6/2003 | Cullen et al. |
| 2003/0120608 A1 | 6/2003 | Pereyra |
| 2003/0131062 A1* | 7/2003 | Miyashita ............ 709/206 |
| 2003/0142125 A1 | 7/2003 | Salmimaa et al. |
| 2003/0167324 A1 | 9/2003 | Farnham et al. |
| 2003/0204439 A1 | 10/2003 | Cullen, III |
| 2003/0220835 A1* | 11/2003 | Barnes, Jr. .......... 705/14 |
| 2003/0220978 A1 | 11/2003 | Rhodes |
| 2003/0220989 A1 | 11/2003 | Tsuji et al. |
| 2003/0233419 A1 | 12/2003 | Beringer |
| 2004/0002903 A1 | 1/2004 | Stolfo et al. |
| 2004/0015554 A1 | 1/2004 | Wilson |
| 2004/0034537 A1 | 2/2004 | Gengarella et al. |
| 2004/0039630 A1 | 2/2004 | Begole et al. |

(56) References Cited

U.S. PATENT DOCUMENTS

| | | |
|---|---|---|
| 2004/0056901 A1 | 3/2004 | March et al. |
| 2004/0068545 A1 | 4/2004 | Daniell et al. |
| 2004/0073616 A1 | 4/2004 | Fellenstein et al. |
| 2004/0078443 A1 | 4/2004 | Malik |
| 2004/0078444 A1 | 4/2004 | Malik |
| 2004/0078445 A1 | 4/2004 | Malik |
| 2004/0100497 A1 | 5/2004 | Quillen et al. |
| 2004/0122904 A1* | 6/2004 | Kim ............................. 709/206 |
| 2004/0128355 A1 | 7/2004 | Chao et al. |
| 2004/0128356 A1 | 7/2004 | Bernstein et al. |
| 2004/0153504 A1 | 8/2004 | Hutchinson et al. |
| 2004/0162878 A1 | 8/2004 | Lewis et al. |
| 2004/0174964 A1 | 9/2004 | Koch |
| 2004/0177048 A1 | 9/2004 | Klug |
| 2004/0186851 A1 | 9/2004 | Jhingan et al. |
| 2004/0202117 A1 | 10/2004 | Wilson et al. |
| 2004/0205002 A1 | 10/2004 | Layton |
| 2004/0215726 A1 | 10/2004 | Arning et al. |
| 2004/0215734 A1* | 10/2004 | Nagai et al. ................. 709/207 |
| 2004/0260756 A1 | 12/2004 | Forstall et al. |
| 2004/0268229 A1 | 12/2004 | Paoli et al. |
| 2005/0027779 A1 | 2/2005 | Schinner |
| 2005/0038687 A1 | 2/2005 | Galdes |
| 2005/0049896 A1* | 3/2005 | Giunta ............................. 705/1 |
| 2005/0055639 A1 | 3/2005 | Fogg |
| 2005/0060638 A1 | 3/2005 | Mathew et al. |
| 2005/0076090 A1 | 4/2005 | Thuerk |
| 2005/0076221 A1* | 4/2005 | Olkin et al. ................. 713/176 |
| 2005/0080868 A1 | 4/2005 | Malik |
| 2005/0091272 A1 | 4/2005 | Smith et al. |
| 2005/0091314 A1 | 4/2005 | Blagsvedt et al. |
| 2005/0091401 A1* | 4/2005 | Keohane et al. ............. 709/240 |
| 2005/0102361 A1 | 5/2005 | Winjum et al. |
| 2005/0108273 A1 | 5/2005 | Brebner |
| 2005/0131888 A1 | 6/2005 | Tafoya et al. |
| 2005/0138070 A1 | 6/2005 | Huberman et al. |
| 2005/0138631 A1 | 6/2005 | Bellotti et al. |
| 2005/0140653 A1 | 6/2005 | Pletikosa et al. |
| 2005/0149620 A1 | 7/2005 | Kirkland et al. |
| 2005/0159970 A1 | 7/2005 | Buyukkokten et al. |
| 2005/0164704 A1 | 7/2005 | Winsor |
| 2005/0165584 A1 | 7/2005 | Boody et al. |
| 2005/0165893 A1 | 7/2005 | Feinberg et al. |
| 2005/0188028 A1 | 8/2005 | Brown, Jr. et al. |
| 2005/0198159 A1 | 9/2005 | Kirsch |
| 2005/0198299 A1 | 9/2005 | Beck et al. |
| 2005/0198305 A1 | 9/2005 | Pezaris et al. |
| 2005/0203929 A1 | 9/2005 | Hazarika et al. |
| 2005/0204009 A1 | 9/2005 | Hazarika et al. |
| 2005/0210111 A1* | 9/2005 | Fukudome .................... 709/206 |
| 2005/0213511 A1 | 9/2005 | Reece, Jr. et al. |
| 2005/0216300 A1 | 9/2005 | Appelman et al. |
| 2005/0222890 A1 | 10/2005 | Cheng et al. |
| 2005/0223315 A1* | 10/2005 | Shimizu et al. .............. 715/512 |
| 2005/0228881 A1 | 10/2005 | Reasor et al. |
| 2005/0228899 A1 | 10/2005 | Wendkos et al. |
| 2005/0235224 A1 | 10/2005 | Arend et al. |
| 2005/0278317 A1 | 12/2005 | Gross et al. |
| 2006/0004892 A1 | 1/2006 | Lunt |
| 2006/0004914 A1 | 1/2006 | Kelly et al. |
| 2006/0015533 A1 | 1/2006 | Wolf et al. |
| 2006/0020398 A1 | 1/2006 | Vernon et al. |
| 2006/0031340 A1 | 2/2006 | Mathew et al. |
| 2006/0031775 A1 | 2/2006 | Sattler et al. |
| 2006/0041508 A1* | 2/2006 | Pham et al. ..................... 705/50 |
| 2006/0047747 A1 | 3/2006 | Erickson et al. |
| 2006/0053199 A1 | 3/2006 | Pricken et al. |
| 2006/0056015 A1 | 3/2006 | Nishiyama |
| 2006/0059151 A1 | 3/2006 | Martinez et al. |
| 2006/0059238 A1 | 3/2006 | Slater et al. |
| 2006/0064434 A1 | 3/2006 | Gilbert et al. |
| 2006/0065733 A1 | 3/2006 | Lee et al. |
| 2006/0075046 A1 | 4/2006 | Yozell-Epstein et al. |
| 2006/0085752 A1 | 4/2006 | Beadle et al. |
| 2006/0095502 A1 | 5/2006 | Lewis et al. |
| 2006/0101285 A1 | 5/2006 | Chen et al. |
| 2006/0101334 A1* | 5/2006 | Liao et al. ..................... 715/523 |
| 2006/0101350 A1 | 5/2006 | Scott |
| 2006/0123357 A1 | 6/2006 | Okamura |
| 2006/0129644 A1* | 6/2006 | Owen et al. ................... 709/206 |
| 2006/0136494 A1 | 6/2006 | Oh |
| 2006/0168059 A1* | 7/2006 | Chang et al. ................. 709/206 |
| 2006/0168073 A1 | 7/2006 | Kogan et al. |
| 2006/0173824 A1 | 8/2006 | Bensky et al. |
| 2006/0173961 A1 | 8/2006 | Turski et al. |
| 2006/0179415 A1 | 8/2006 | Cadiz et al. |
| 2006/0195361 A1 | 8/2006 | Rosenberg |
| 2006/0195474 A1 | 8/2006 | Cadiz et al. |
| 2006/0195785 A1 | 8/2006 | Portnoy et al. |
| 2006/0217116 A1 | 9/2006 | Cassett et al. |
| 2006/0224675 A1 | 10/2006 | Fox et al. |
| 2006/0224938 A1* | 10/2006 | Fikes et al. .................... 715/500 |
| 2006/0242536 A1 | 10/2006 | Yokokawa et al. |
| 2006/0242609 A1 | 10/2006 | Potter et al. |
| 2006/0248151 A1 | 11/2006 | Belakovskiy et al. |
| 2006/0256008 A1 | 11/2006 | Rosenberg |
| 2006/0271630 A1 | 11/2006 | Bensky et al. |
| 2006/0281447 A1 | 12/2006 | Lewis et al. |
| 2006/0282303 A1 | 12/2006 | Hale et al. |
| 2007/0005702 A1 | 1/2007 | Tokuda et al. |
| 2007/0005715 A1 | 1/2007 | LeVasseur et al. |
| 2007/0005750 A1 | 1/2007 | Lunt et al. |
| 2007/0011367 A1 | 1/2007 | Scott et al. |
| 2007/0016647 A1 | 1/2007 | Gupta et al. |
| 2007/0022447 A1 | 1/2007 | Arseneau et al. |
| 2007/0038720 A1 | 2/2007 | Reding et al. |
| 2007/0050711 A1* | 3/2007 | Walker et al. ................ 715/530 |
| 2007/0060328 A1 | 3/2007 | Zrike et al. |
| 2007/0071187 A1 | 3/2007 | Apreutesei et al. |
| 2007/0083651 A1 | 4/2007 | Ishida |
| 2007/0088687 A1 | 4/2007 | Bromm et al. |
| 2007/0106780 A1 | 5/2007 | Farnham et al. |
| 2007/0112761 A1 | 5/2007 | Xu et al. |
| 2007/0115991 A1 | 5/2007 | Ramani et al. |
| 2007/0118528 A1* | 5/2007 | Choi et al. ........................ 707/9 |
| 2007/0123222 A1 | 5/2007 | Cox et al. |
| 2007/0124432 A1 | 5/2007 | Holtzman et al. |
| 2007/0129977 A1 | 6/2007 | Forney |
| 2007/0130527 A1 | 6/2007 | Kim |
| 2007/0143414 A1 | 6/2007 | Daigle |
| 2007/0156732 A1 | 7/2007 | Surendran et al. |
| 2007/0174432 A1 | 7/2007 | Rhee et al. |
| 2007/0177717 A1 | 8/2007 | Owens et al. |
| 2007/0185844 A1 | 8/2007 | Schachter |
| 2007/0192490 A1 | 8/2007 | Minhas |
| 2007/0192699 A1 | 8/2007 | Lee et al. |
| 2007/0203991 A1 | 8/2007 | Fisher et al. |
| 2007/0214141 A1 | 9/2007 | Sittig |
| 2007/0218900 A1 | 9/2007 | Abhyanker |
| 2007/0244881 A1 | 10/2007 | Cha et al. |
| 2007/0255794 A1 | 11/2007 | Coutts |
| 2007/0266001 A1* | 11/2007 | Williams et al. ................. 707/2 |
| 2007/0271527 A1 | 11/2007 | Paas et al. |
| 2007/0273517 A1 | 11/2007 | Govind |
| 2007/0282956 A1 | 12/2007 | Staats |
| 2007/0288578 A1 | 12/2007 | Pantalone |
| 2007/0294428 A1 | 12/2007 | Guy et al. |
| 2008/0005247 A9 | 1/2008 | Khoo |
| 2008/0005249 A1 | 1/2008 | Hart |
| 2008/0031241 A1 | 2/2008 | Toebes et al. |
| 2008/0037721 A1 | 2/2008 | Yao et al. |
| 2008/0040370 A1 | 2/2008 | Bosworth |
| 2008/0040474 A1 | 2/2008 | Zuckerberg |
| 2008/0040475 A1 | 2/2008 | Bosworth |
| 2008/0055263 A1 | 3/2008 | Lemay et al. |
| 2008/0056269 A1 | 3/2008 | Madhani et al. |
| 2008/0065701 A1 | 3/2008 | Lindstrom et al. |
| 2008/0071872 A1 | 3/2008 | Gross |
| 2008/0077614 A1 | 3/2008 | Roy |
| 2008/0104052 A1 | 5/2008 | Ryan et al. |
| 2008/0113674 A1 | 5/2008 | Baig |
| 2008/0114758 A1 | 5/2008 | Rupp et al. |
| 2008/0119201 A1 | 5/2008 | Kolber et al. |
| 2008/0120411 A1 | 5/2008 | Eberle |

(56) References Cited

U.S. PATENT DOCUMENTS

| | | | |
|---|---|---|---|
| 2008/0122796 A1 | 5/2008 | Jobs et al. | |
| 2008/0147639 A1 | 6/2008 | Hartman et al. | |
| 2008/0147810 A1 | 6/2008 | Kumar et al. | |
| 2008/0154751 A1* | 6/2008 | Miles | 705/28 |
| 2008/0162347 A1 | 7/2008 | Wagner | |
| 2008/0162649 A1 | 7/2008 | Lee et al. | |
| 2008/0162651 A1 | 7/2008 | Madnani | |
| 2008/0163164 A1 | 7/2008 | Chowdhary et al. | |
| 2008/0170158 A1 | 7/2008 | Jung et al. | |
| 2008/0172362 A1 | 7/2008 | Shacham et al. | |
| 2008/0172464 A1 | 7/2008 | Thattai et al. | |
| 2008/0183832 A1 | 7/2008 | Kirkland et al. | |
| 2008/0216092 A1 | 9/2008 | Serlet | |
| 2008/0220752 A1 | 9/2008 | Forstall et al. | |
| 2008/0222279 A1 | 9/2008 | Cioffi et al. | |
| 2008/0222546 A1 | 9/2008 | Mudd et al. | |
| 2008/0235353 A1 | 9/2008 | Cheever et al. | |
| 2008/0235681 A1* | 9/2008 | Barnett | 717/178 |
| 2008/0242277 A1 | 10/2008 | Chen et al. | |
| 2008/0243841 A1* | 10/2008 | Bonnet et al. | 707/6 |
| 2008/0244070 A1* | 10/2008 | Kita et al. | 709/225 |
| 2008/0261569 A1* | 10/2008 | Britt et al. | 455/414.1 |
| 2008/0270038 A1 | 10/2008 | Partovi et al. | |
| 2008/0270939 A1 | 10/2008 | Mueller | |
| 2008/0275748 A1 | 11/2008 | John | |
| 2008/0275865 A1 | 11/2008 | Kretz et al. | |
| 2008/0293403 A1 | 11/2008 | Quon et al. | |
| 2008/0301166 A1 | 12/2008 | Sugiyama et al. | |
| 2008/0301175 A1 | 12/2008 | Applebaum et al. | |
| 2008/0301245 A1 | 12/2008 | Estrada et al. | |
| 2008/0307046 A1* | 12/2008 | Baek et al. | 709/203 |
| 2008/0307066 A1 | 12/2008 | Amidon et al. | |
| 2008/0319943 A1 | 12/2008 | Fischer | |
| 2008/0320417 A1* | 12/2008 | Begley et al. | 715/822 |
| 2009/0005076 A1 | 1/2009 | Forstall et al. | |
| 2009/0010353 A1 | 1/2009 | She et al. | |
| 2009/0012806 A1 | 1/2009 | Ricordi et al. | |
| 2009/0029674 A1 | 1/2009 | Brezina et al. | |
| 2009/0030872 A1 | 1/2009 | Brezina et al. | |
| 2009/0030919 A1* | 1/2009 | Brezina et al. | 707/100 |
| 2009/0030933 A1 | 1/2009 | Brezina et al. | |
| 2009/0030940 A1 | 1/2009 | Brezina et al. | |
| 2009/0031232 A1 | 1/2009 | Brezina et al. | |
| 2009/0031244 A1 | 1/2009 | Brezina et al. | |
| 2009/0031245 A1 | 1/2009 | Brezina et al. | |
| 2009/0037541 A1 | 2/2009 | Wilson | |
| 2009/0041224 A1 | 2/2009 | Bychkov et al. | |
| 2009/0048994 A1 | 2/2009 | Applebaum et al. | |
| 2009/0054091 A1 | 2/2009 | van Wijk et al. | |
| 2009/0070412 A1 | 3/2009 | D'Angelo | |
| 2009/0077026 A1 | 3/2009 | Yanagihara | |
| 2009/0083278 A1 | 3/2009 | Zhao et al. | |
| 2009/0106415 A1 | 4/2009 | Brezina et al. | |
| 2009/0106676 A1* | 4/2009 | Brezina et al. | 715/763 |
| 2009/0111495 A1 | 4/2009 | Sjolin et al. | |
| 2009/0112678 A1* | 4/2009 | Luzardo | 705/8 |
| 2009/0119678 A1 | 5/2009 | Shih et al. | |
| 2009/0132949 A1* | 5/2009 | Bosarge | 715/777 |
| 2009/0156170 A1 | 6/2009 | Rossano et al. | |
| 2009/0157717 A1 | 6/2009 | Palahnuk et al. | |
| 2009/0164902 A1* | 6/2009 | Cohen et al. | 715/716 |
| 2009/0171930 A1 | 7/2009 | Vaughan et al. | |
| 2009/0171979 A1 | 7/2009 | Lubarski et al. | |
| 2009/0174680 A1 | 7/2009 | Anzures et al. | |
| 2009/0177754 A1* | 7/2009 | Brezina et al. | 709/206 |
| 2009/0182552 A1 | 7/2009 | Fyke et al. | |
| 2009/0182788 A1 | 7/2009 | Chung et al. | |
| 2009/0191899 A1 | 7/2009 | Wilson et al. | |
| 2009/0198688 A1 | 8/2009 | Venkataraman et al. | |
| 2009/0204903 A1* | 8/2009 | Edelen | G06Q 10/107 715/752 |
| 2009/0213088 A1 | 8/2009 | Hardy et al. | |
| 2009/0228555 A1 | 9/2009 | Joviak et al. | |
| 2009/0234815 A1 | 9/2009 | Boerries et al. | |
| 2009/0240669 A1* | 9/2009 | Ando et al. | 707/3 |
| 2009/0249198 A1 | 10/2009 | Davis et al. | |
| 2009/0271370 A1 | 10/2009 | Jagadish et al. | |
| 2009/0276713 A1* | 11/2009 | Eddy | 715/733 |
| 2009/0300546 A1 | 12/2009 | Kwok et al. | |
| 2009/0306981 A1 | 12/2009 | Cromack et al. | |
| 2009/0313573 A1 | 12/2009 | Paek et al. | |
| 2009/0319329 A1 | 12/2009 | Aggarwal et al. | |
| 2009/0327849 A1* | 12/2009 | Kavanagh et al. | 715/205 |
| 2010/0009332 A1 | 1/2010 | Yaskin et al. | |
| 2010/0030715 A1 | 2/2010 | Eustice et al. | |
| 2010/0049534 A1 | 2/2010 | Whitnah | |
| 2010/0057859 A1 | 3/2010 | Shen et al. | |
| 2010/0060595 A1 | 3/2010 | Lee et al. | |
| 2010/0062753 A1 | 3/2010 | Wen et al. | |
| 2010/0073284 A1 | 3/2010 | Dods et al. | |
| 2010/0077041 A1 | 3/2010 | Cowan et al. | |
| 2010/0082693 A1 | 4/2010 | Hugg et al. | |
| 2010/0094869 A1 | 4/2010 | Ebanks | |
| 2010/0131447 A1 | 5/2010 | Creutz et al. | |
| 2010/0153832 A1 | 6/2010 | Markus et al. | |
| 2010/0161729 A1 | 6/2010 | Leblanc et al. | |
| 2010/0164957 A1 | 7/2010 | Lindsay | |
| 2010/0169327 A1 | 7/2010 | Lindsay | |
| 2010/0174784 A1 | 7/2010 | Levey et al. | |
| 2010/0185610 A1 | 7/2010 | Lunt | |
| 2010/0191844 A1 | 7/2010 | He et al. | |
| 2010/0216509 A1 | 8/2010 | Riemer et al. | |
| 2010/0228560 A1 | 9/2010 | Balasaygun et al. | |
| 2010/0229096 A1 | 9/2010 | Maiocco et al. | |
| 2010/0229223 A1 | 9/2010 | Shepard | |
| 2010/0235375 A1 | 9/2010 | Sidhu et al. | |
| 2010/0241579 A1 | 9/2010 | Bassett et al. | |
| 2010/0250682 A1 | 9/2010 | Goldberg et al. | |
| 2010/0273456 A1* | 10/2010 | Wolovitz et al. | 455/412.2 |
| 2010/0281535 A1 | 11/2010 | Perry, Jr. et al. | |
| 2010/0306185 A1 | 12/2010 | Smith | |
| 2010/0330972 A1 | 12/2010 | Angiolillo | |
| 2011/0010423 A1 | 1/2011 | Thatcher et al. | |
| 2011/0035451 A1 | 2/2011 | Smith et al. | |
| 2011/0040726 A1 | 2/2011 | Crosbie et al. | |
| 2011/0087969 A1 | 4/2011 | Hein et al. | |
| 2011/0113317 A1* | 5/2011 | Ramaswamy | 715/205 |
| 2011/0145192 A1 | 6/2011 | Quintela et al. | |
| 2011/0145219 A1 | 6/2011 | Cierniak et al. | |
| 2011/0173547 A1 | 7/2011 | Lewis et al. | |
| 2011/0191337 A1 | 8/2011 | Cort et al. | |
| 2011/0191340 A1 | 8/2011 | Cort et al. | |
| 2011/0191717 A1 | 8/2011 | Cort et al. | |
| 2011/0196802 A1 | 8/2011 | Ellis et al. | |
| 2011/0219317 A1 | 9/2011 | Thatcher et al. | |
| 2011/0225293 A1 | 9/2011 | Rathod | |
| 2011/0276396 A1 | 11/2011 | Rathod | |
| 2011/0282905 A1 | 11/2011 | Polis et al. | |
| 2011/0291933 A1 | 12/2011 | Holzer et al. | |
| 2011/0298701 A1 | 12/2011 | Holzer et al. | |
| 2012/0011204 A1 | 1/2012 | Morin et al. | |
| 2012/0017158 A1 | 1/2012 | Maguire et al. | |
| 2012/0023416 A1* | 1/2012 | Khoo | 715/752 |
| 2012/0036254 A1 | 2/2012 | Onuma | |
| 2012/0054681 A1 | 3/2012 | Cort et al. | |
| 2012/0060102 A1* | 3/2012 | Shohfi et al. | 715/752 |
| 2012/0089678 A1 | 4/2012 | Cort et al. | |
| 2012/0089690 A1 | 4/2012 | Hein et al. | |
| 2012/0110080 A1 | 5/2012 | Panyam et al. | |
| 2012/0150979 A1 | 6/2012 | Monaco | |
| 2012/0166999 A1 | 6/2012 | Thatcher et al. | |
| 2012/0204089 A1* | 8/2012 | Boudreau et al. | 715/205 |
| 2012/0246065 A1 | 9/2012 | Yarvis et al. | |
| 2012/0259834 A1 | 10/2012 | Broder et al. | |
| 2012/0310977 A1* | 12/2012 | Bush et al. | 707/769 |
| 2013/0053074 A1* | 2/2013 | Sanchez et al. | 455/456.6 |
| 2013/0080915 A1 | 3/2013 | Lewis et al. | |
| 2013/0091288 A1 | 4/2013 | Shalunov et al. | |
| 2014/0081914 A1 | 3/2014 | Smith et al. | |
| 2014/0087687 A1 | 3/2014 | Brezina et al. | |
| 2014/0095433 A1 | 4/2014 | Cort et al. | |
| 2014/0100861 A1 | 4/2014 | Ledet | |
| 2014/0115086 A1 | 4/2014 | Chebiyyam | |
| 2014/0207761 A1* | 7/2014 | Brezina et al. | 707/722 |

(56) References Cited

U.S. PATENT DOCUMENTS

| | | | |
|---|---|---|---|
| 2014/0214981 A1 | 7/2014 | Mallet et al. | |
| 2014/0215626 A1* | 7/2014 | Pam et al. | 726/23 |
| 2014/0280097 A1 | 9/2014 | Lee et al. | |
| 2014/0287786 A1 | 9/2014 | Bayraktar et al. | |
| 2016/0070787 A1 | 3/2016 | Brezina et al. | |

FOREIGN PATENT DOCUMENTS

| | | |
|---|---|---|
| JP | 2007249307 | 9/2007 |
| KR | 20060056015 | 5/2006 |
| KR | 1020090068819 | 6/2009 |
| KR | 1020090112257 | 10/2009 |
| KR | 1020090115239 | 11/2009 |
| KR | 1020020060386 | 8/2012 |
| WO | 03098515 | 11/2003 |
| WO | 2007037875 | 4/2007 |
| WO | 2007143232 | 12/2007 |
| WO | 2012082886 | 6/2012 |
| WO | 2012082929 | 6/2012 |

OTHER PUBLICATIONS

Android-Tips.com, "Android Tips & Tricks: How to Import Contacts into Android Phone," located at http://android-tips.com/how-to-import-contacts-into-android/, Nov. 17, 2008.

Bernstein, Michael S. et al., "Enhancing Directed Content Sharing on the Web," Proceedings of the 28th International Conference on Human Factors in Computing Systems, Atlanta, GA, Apr. 10-15, 2010, pp. 971-980.

Carvalho, Vitor R. et al., "Ranking Users for Intelligent Message Addressing," Proceedings of the 30th European Conference on Information Retrieval, Glasgow, England, Mar. 30-Apr. 3, 2008, pp. 321-333.

Culotta, Aron et al., "Extracting Social Networks and Contact Information from Email and the Web," Proceedings of the First Conference on Email and Anti-Spam (CEAS), Mountain View, CA, Jul. 30-31, 2004.

Elsayed, Tamer et al., "Personal Name Resolution in Email: A Heuristic Approach," University of Maryland Technical Report No. TR-LAMP-150, Mar. 17, 2008.

Fitzpatrick, Brad, "AddressBooker," Github Social Coding, located at http://addressbooker.appspot.com/, Nov. 28, 2008.

Google Inc. "OpenSocial Tutorial," located at http://code.google.com/apis/opensocial/articles/tutorial/tutorial-0.8.html, Aug. 2008.

Google Inc., "Automatic Updating of Contacts," Gmail help forum, located at http://74.125.4.16/support/forum/p/gmail/thread?tid=03f7b692150d9242&hl=en, Apr. 27, 2009.

Hillebrand, Tim, "Plaxo: The Smart Auto Update Address Book," Smart Phone Mag, located at http://www.smartphonemag.com/cms/blogs/9/plaxo_the_smart_auto_update_address_book, Nov. 6, 2006.

International Patent Application PCT/US10/34782, International Search Report, Dec. 22, 2010.

International Patent Application PCT/US10/34782, Written Opinion, Dec. 22, 2010.

International Patent Application PCT/US10/35405, International Search Report and Written Opinion, Jan. 3, 2011.

International Patent Application PCT/US12/043523, International Search Report and Written Opinion, Nov. 28, 2012.

International Patent Application PCT/US2011/064892, International Search Report and Written Opinion, Aug. 22, 2012.

Microsoft Corporation, "About AutoComplete Name Suggesting," Microsoft Outlook 2003 help forum, located at http://office.microsoft.com/en-us/outlook/HP063766471033.aspx, 2003.

OpenSocial Foundation, "Social Application Tutorial (v0.9)," located at http://wiki.opensocial.org/index.php?title=Social_Application_Tutorial, accessed Oct. 8, 2010.

PCWorld Communications, Inc., "Your Contacts Are Forever: Self-Updating Address Book," located at http://www.pcworld.com/article/48192/your_contacts_are_forever_selfupdating_address_book.html, May 1, 2001.

U.S. Appl. No. 61/407,018, filed Oct. 27, 2010.

Extended European Search Report, EP 10 78 3783, dated Mar. 24, 2014.

European Patent Application No. 11849271.9, Extended Search Report, Apr. 3, 2014.

European Patent Application No. 12801970.0, Extended Search Report, Oct. 23, 2014.

European Patent Application 12801998.1, Extended Search Report, Feb. 10, 2015.

International Patent Application PCT/US10/52081, International Search Report and Written Opinion, May 20, 2011.

International Patent Application PCT/US11/64958, International Search Report and Written Opinion, Jul. 31, 2012.

International Patent Application PCT/US2012/043507, International Search Report and Written Opinion, Jan. 3, 2013.

Oberhaus, Kristin, "Look for Cues: Targeting Without Personally Identifiable Information," W3i, LLC blog entry located at http://blog.w3i.com/2009/09/03/looking-for-cues-targeting-without-personally-identifiable-information/, Sep. 3, 2009.

W3i, LLC, "Advertiser Feedback System (AFS)," company product description. Sep. 22, 2009.

Wikimedia Foundation, Inc., "Machine Learning," Wikipedia encyclopedia entry located at http://en.wikipedia.org/wiki/Machine_learning, Jan. 30, 2011.

* cited by examiner

COLLECTING AND PRESENTING DATA INCLUDING LINKS FROM COMMUNICATIONS SENT TO OR FROM A USER

RELATED APPLICATIONS

The present application claims priority to U.S. Provisional Application Ser. No. 61/261,680, filed Nov. 16, 2009, entitled "METHOD AND SYSTEM FOR COLLECTING AND PRESENTING HISTORICAL COMMUNICATION DATA," by Jacobson et al., the entire contents of which application is incorporated by reference as if fully set forth herein.

The present application is related to U.S. patent application Ser. No. 12/180,495, filed Jul. 25, 2008 and published on Jan. 29, 2009 as U.S. Pat. App. Pub. No. 2009/0031245, the disclosure of which is incorporated herein by reference.

BACKGROUND

Electronic communications between persons for both business and personal use have increased substantially in recent years. In addition to the number of communications increasing, the number of available communication mediums has also increased. In addition to e-mail communications and telephone communications, additional forms of communication have become common in recent years, including instant messaging, social network messaging and commenting, message board posting, text messaging, and Voice Over Internet Protocol communications.

These additional forms of communication have led to individuals exchanging communications with more people than ever before, which leads to an even higher increase in the number of communications sent and received by an individual.

SUMMARY OF THE DESCRIPTION

The present disclosure relates to collecting and presenting data relating to communications sent to or from a user, the communications including one or more links displayed to the user. Some embodiments are summarized in this section.

In a first aspect, a computer implemented method for presenting information related to historical communication and personal data can include collecting historical communication data and personal data relating to a portion of a plurality of communications, a sender of one or more of the communications or one or more recipients of the communications. The method can further include depositing the collected data into a repository of historical communication data and personal data. The method can further include presenting one or more items in the repository, in response to user behavior selected from the group comprising opening a communication, viewing a communication, reading a communication, writing a communication, performing a search, selecting a person's name, selecting a communication summary, and selecting an attribute associated with the one or more items.

The method can further include querying one or more sources of information to derive the historical communication data and the personal data. The method can further include requesting information from a sender of a communication or one or more recipients of the communication. The method can further include displaying the one or more items in an additional portion of a user interface (e.g., in a panel) within an e-mail client, web browser, or instant message window. The method can further include displaying the one or more items integrated with a body of the communication using one or more display methods selected from the group comprising highlighting, underlining, adding hyper links, adding text, adding images, adding video, and adding attachments.

The method can further include tracking mouse movements, mouse locations, keyboard strokes, mouse clicks, or active windows in order to determine if the user has made an implicit request to view one or more items in the repository. The method can further include sharing some or all of the data in the repository among a network of participants. The method can further include sharing different amounts of data from the repository with each participant based on preference settings. The method can further include allowing a user to select one or more of the one or more presented items and automatically generating a communication in response to the user selection.

In one embodiment, information is presented to a user of a user device by a method including: collecting data relating to communications sent to or from the user, including to or from a first person, each communication including a link of a plurality of links; generating personal profiles from the collected data, the profiles comprising a first personal profile of the first person and including a first link of the plurality of links; and presenting the first personal profile to the user, comprising displaying the first link in a user interface on the user device.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Figure 1A:
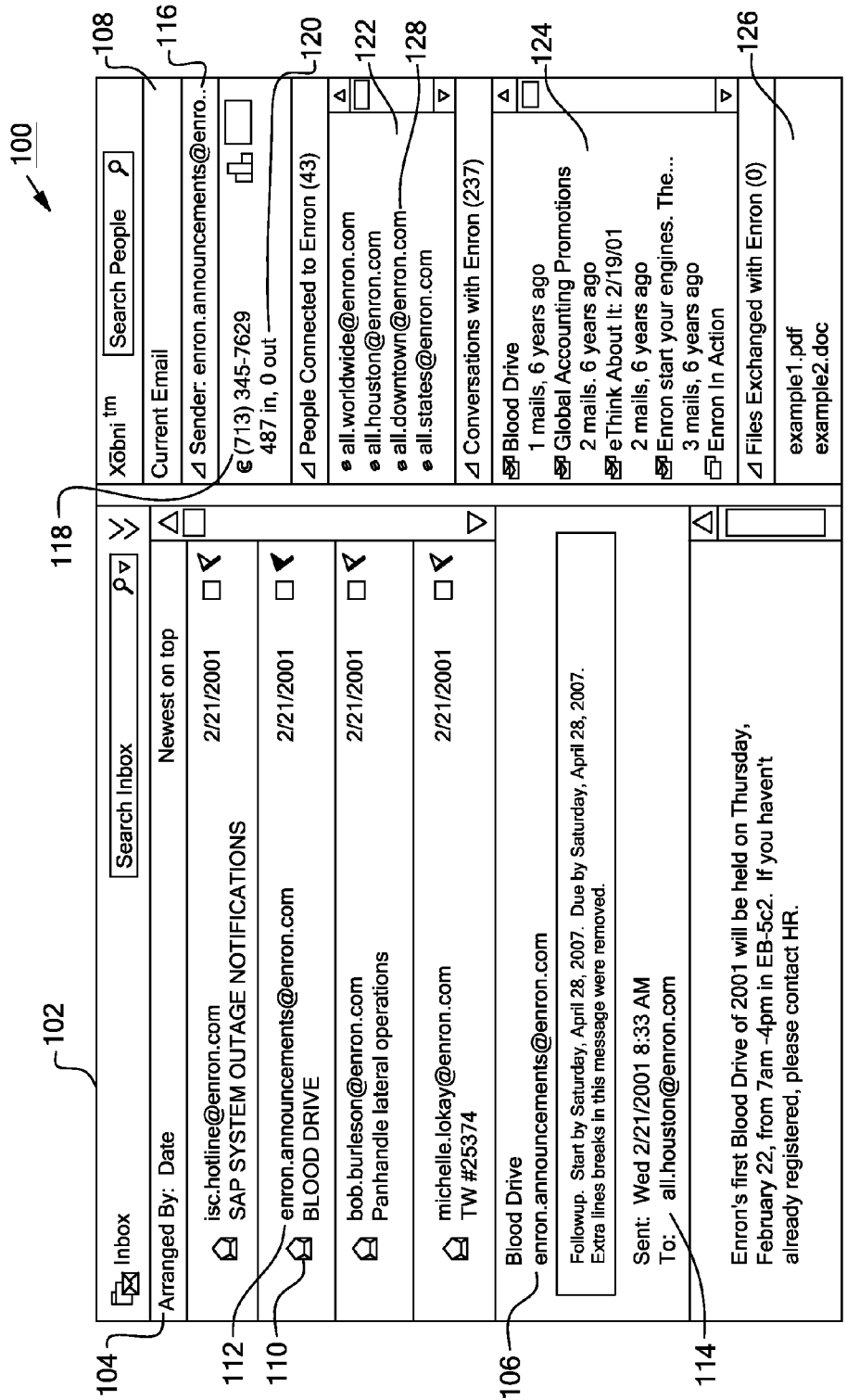
FIG. 1A shows an example e-mail client with a person profile side bar.

FIG. 1A shows an example system 100 for displaying a personal profile containing information about communications to, from, and involving an individual. The system 100 includes an e-mail client 102 which can include an inbox viewing panel 104 and an e-mail viewing panel 106. The e-mail client 102 can be a standard stand alone e-mail client such as Microsoft Outlook or Eudora. In an alternate implementation the email client 102 can be a web based e-mail client such as Yahoo! mail or Gmail that is viewed using a web browser. The e-mail client 102 can allow a user to view a list of e-mails in the inbox viewing panel 104. The user can select an e-mail in the inbox viewing panel 104 causing the e-mail client 102 to display the selected e-mail in the e-mail viewing panel 106.

In some implementations, instead of an e-mail client, the system 100 can include an instant messaging client, a social network client, a text message client, or another communication viewing client. It is to be understood that while portions of this description describe systems and methods involving e-mail communications, these same systems and methods can be implemented using other forms of communication, including instant messages, phone calls, text messages, internet message board postings, social network messages or comments, or voice over IP communications.

The e-mail client 102 also includes a personal profile 108. In the example depicted, the personal profile 108 is displayed as an additional panel within the e-mail client 102 positioned to the right of the inbox viewing panel 104 and the e-mail viewing panel 106. This additional panel is sometimes referred to as a side bar. In some implementations, the personal profile 108 can be located at the top, bottom, left side, or any other location within the e-mail client 102. In still some implementations, the personal profile 108 can be displayed in a stand alone window, in a pop-up bubble displayed over a portion of the e-mail client 102, or integrated as part of one of the other viewing panels displayed by the e-mail client 102. For example, a pop up bubble containing a personal profile 108 can be displayed when an e-mail is selected in the inbox viewing panel 104, when an e-mail address or portion of text in the e-mail viewing panel 106 is selected, or when a mouse icon is moved over an e-mail address, name, icon, or portion of text. In another example, information can be integrated as part of the body of an e-mail, such as inserting a picture next to a person's name in the body of an e-mail, or inserting a person's name next to a phone number in an e-mail or attachment.

The personal profile 108 can contain information relating to a sender of an e-mail, a recipient of an e-mail, the body of an e-mail, an attachment to an e-mail, or a person or topic mentioned in an e-mail. In alternate implementations, the personal profile 108 can contain information related to a sender, recipient, body, attachment or topic of another communication medium such as an instant message, a phone call, a text message, an internet message board, a social network message or comment, or a voice over IP communication. The user can implicitly request information to be displayed in the personal profile 108 by selecting an e-mail in the inbox viewing panel 104 or selecting text within a header or body of an e-mail in the e-mail viewing panel 106. In some implementations, the profile can include additional information (e.g., derived information such as search results derived from a topic mentioned in a communication).

In some implementations, the person profile 108 can display information about an entity other than a person. For example, a communication may be received from an automated system, such as from a travel website, on-line retailer, an advertising service, or a mailing list. The person profile 108 can display information related to the sender of the communication. For example, if the communication received has been sent from a travel website, information related to the travel website, or other communications from the travel website can be displayed. In another example, if the communication received has been sent from a mailing list, information related to the mailing list, or other communications received from the mailing list can be displayed. As yet another example, if the communication received has been sent from a business entity, information about the business entity (e.g., address, telephone number, contact person name) can be included in the personal profile.

For example, the user can select an e-mail 110 in the inbox viewing panel 104 causing the personal profile 108 to display information related to a sender 112 of the e-mail 110. In another example, the user can select an e-mail address 114 or name of a recipient of the e-mail 110 in order to display information related to the recipient in the personal profile 108. In another example, the user can select an attachment to the e-mail 110 in order to display information related to the attachment in the personal profile 108. In yet another example, the user can select the name of a person, a user name of a person, or a particular topic listed in a header, a body, or an attachment of the e-mail 110 in order to display information related to the person or topic in the personal profile 108.

In some implementations, the system 100 can determine if the user has made an implicit request to view information in the personal profile 108 by tracking, for example, user input of the form of mouse movements, mouse locations, keyboard strokes, mouse clicks, or active windows. Implicit requests to view information in the person profile 108 can include opening, viewing, reading or writing an e-mail or other communication medium. For example, if the user starts to compose an instant message, the personal profile 108 can display information related to the recipient of the instant message. In another example, if the user views a social network profile, either within the e-mail client 102 or in a separate web browser, the personal profile 108 can display information related to a person associated with the social network profile.

In some implementations, the user can make a specific request to view information in the personal profile 108 by performing a search or clicking on a person's name.

In some implementations, the system 100 can be linked to a phone (e.g., voice over IP phone) used by the user. For example, the system 100 can include means for detecting when the user makes or receives a phone call or text message using the phone and display information related to a recipient or initiator of the phone call or text message in the personal profile 108.

In the example depicted in FIG. 1A, the user has selected the e-mail 110 in the inbox viewing panel 104 and header information and a portion of the body of the e-mail 110 is displayed in the e-mail viewing panel 106. The e-mail 110 was received from the sender 112. The system 100 has determined that the user has made an implicit request to view information related to the sender 112 by selecting the e-mail 110. In response to this implicit request, the system 100 displays in the person profile 108 information related to the sender 112.

In the example, the information displayed in the person profile 108 includes an e-mail address 116, a phone number 118, communication statistics 120, a contact network 122, a conversation list 124, and a files exchanged list 126. In some implementations, the person profile 108 can display additional contact information such as name, screen names, social network profile names, social network profile URLs, physical addresses, website URLs, additional e-mail addresses, or additional telephone numbers.

In the example, the communication statistics 120 include the number of e-mails received from the sender 112 and the number of e-mails sent to the sender 112. In some implementations, additional communication statistics 120 can be displayed, including times of communications, dates of communications, types of communications, volume of communications, length of communications, or speed of responses. For example, a statistic for the average amount of time it takes the sender 112 to respond to e-mails sent by the user can be displayed. In another example, the times of day that the sender 112 is most likely to respond to an e-mail or other form of communication can be displayed as a communication statistic 120. In another example, a statistic can be displayed that lists the percentage of communications between the user and the sender 112 that occur using a telephone, the percentage of communications that occur using instant messaging, the percentage of communications that occur using e-mails, or the percentage of communications that occur using a social network website as a percentage of all communications between the user and the sender 112. In another example, the number of communications sent or received on which the sender 112 has been copied can be displayed as a communication statistic 120. In another example, the number of communications received by the user on which the sender 112 has also been listed as a recipient can be displayed as a communication statistic 120.

In some implementations, the communication statistics 120 that are displayed can be chosen by the user. The user can choose to have a default set of communication statistics displayed, or the user can select which individual communication statistics 120 are to be displayed. The user can choose to have the same set of communication statistics 120 displayed for each person profile 108 or the user can choose to have a different set of communication statistics 120 displayed depending on which person or topic the currently displayed person profile 108 is associated with.

The contact network 122 displayed in the person profile 108 shows a list of contacts 128 that are associated with the sender 112. In the example depicted, the contacts 128 are shown as e-mail addresses. In some implementations, the contacts 128 can be listed as names, screen names, nick names, employee numbers, social network profile names, social network profile URLs, telephone numbers, website URLs, or any combination of these.

In some implementations, details about a contact 128 can be displayed adjacent to the contact 128 in the contact network 122. These details can include time since last communication, last form of communication, frequency of communications, total numbers of communications, or other related data.

The contacts 128 listed in the contact network 122 are contacts that are associated with the sender 112. The contacts 128 can include recipients of communications from the sender 112, recipients of communications of which the sender 112 is also a recipient, individuals named in a body or header of a communication with the sender 112, or individuals named in a document that is attached to a communication with the sender 112. For example, a person who was copied on an e-mail between the user and the sender 112 can be listed as a contact 128 in the contact network 122. In the example depicted the header of the e-mail 110 as shown in the e-mail viewing panel 106 lists all.houston@enron.com as a recipient of the e-mail 110. The contact network 122 lists all.houston@enron.com as a contact 128 of the sender 112. In another example, if the user receives an e-mail from the sender 112 with the subject line "Matt Smith's birthday party", Matt Smith can be listed as a contact 128 in the contact network 122 even if Matt Smith has never been included in or been the recipient of any communications between the user and the sender 112. In another example, if the user posts a comment to a social network profile page belonging to the sender 112 and a person named Eric Johnson has also posted a comment to the social network profile page, or is listed as a friend of the sender 112 on the social network profile page, Eric Johnson can be listed as a contact 128 in the contact network 122.

In some implementations, the contacts 128 listed in the contact network 122 can be collected from sources other than communications between the user and the sender 112. In one implementation, the sender 112 can provide a list of contacts to the user to include in the contact network 122 for the sender 112. The sender 112 can provide the list of contacts to the user through sharing the list of contacts on a shared network, or by sending a communication to the user with, for example, the list of contacts in a body of the communication or in an attachment to the communication.

In some implementations, the system 100 can collect data from outside sources in order to determine contacts 128 to be listed in the contact network 122. The system 100 can query various sources to extract information on contacts that can be associated with the sender 112 and listed in the contact network 122. Sources of information that can be queried to derive contacts associated with the sender 112 can include web search engines, people search engines, social networks, personal web pages, telephone directories, scanned business card data or company website profiles.

For example, the system 100 can perform a search of a social network based on the sender 112's name, e-mail address, screen names or other information about the sender 112. The system can then identify a profile page on the social network belonging to the sender 112. Any contacts that are publicly listed on the social network profile page can be listed in the contact network 122 of the sender 112 even if the user has never communicated with the sender 112 using the social network or viewed the profile page of the sender 112 on this social network. In some implementations, the system 100 can access and extract contacts listed on a private social network profile page belonging to the sender 112 if the user has proper access information or authorization to view the private social network profile page of the sender 112.

In another example, the system 100 can use a search engine to perform a search based on the sender 112's name, e-mail address, screen names or other information about the sender 112 in order to identify web pages that may contain contacts that can be associated with the sender 112. For example, the system 100 can use a search engine to perform a search based on the sender 112's name. If one of the search results returned is for a blog written by a person named Mark Adams that mentions the sender 112, then Mark Adams can be listed as a contact 128 in the contact network 122. In another example, the system 100 can determine that the sender 112 works for the same company as a person who has sent a different communication to the user. This person can then be listed as a contact 128 of the sender 112. In some implementations, the system 100 can collect data using a peer to peer network.

Information that can be used to collect information about contacts 128 or other information displayed in the personal profile 108 can include e-mail addresses, names, screen names, social network profile names, phone numbers, personal website URLs, social network profile URLs, or physical addresses.

The contacts 128 displayed in the contact network 122 can be listed in order based on a ranking system. Criteria used to rank the contacts 128 can include total volume of communication, volume of communication over a period of time, length of communications, importance level of communications, types of communications, contents of communications, time of communications; methods by which the contacts 128 were determined to be associated with the sender 112, or any combination of these. For example, the contacts 128 can be ranked based on the total number of communications between the user and the sender 112 for which a contact is also a recipient of the communication. In another example, the contacts 128 can be ranked based on the number of communications between the user and the sender 112 for which a contact is also a recipient of the communication over the course of the last three weeks. In another example, the contacts 128 can be ranked based on the number of communications between the user and a contact for which the sender 112 is also a recipient of the communication.

In another example, the contacts 128 can be ranked based on the length of communications between the user and the sender 112 for which a contact is also a recipient of the communication with longer communications being ranked higher than shorter communications. In another example, contacts that are listed on communications flagged as urgent or important can be ranked higher than other contacts. In another example, the user can choose to have contacts who mainly communicate with the user or sender 112 using e-mail ranked higher than contacts who mainly communicate with the user or sender 112 using instant message or social networks. In another example, the system 100 can use the contents of communications involving each contact 128 and the sender 112 to determine if communications involving the contact 128 and the sender 112 are primarily business related or social related communications. The system 100 can then give a higher ranking to contacts associated with business communications than contacts associated with social communications.

In another example, contacts who are associated with more recent communications between the user and the sender 112 can be ranked higher than contacts associated with older communications between the user and the sender 112. In another example, contacts that have been determined to be associated with the sender 112 based on e-mail communication can be ranked higher than contacts that have been determined to be associated with the sender 112 based on web searches.

In some implementations, each contact 128 listed in the contact network 122 can be a link to more information about the contact 128. For example, if a contact 128 is clicked on, selected, or interacted with by the user, a person profile containing information about the selected contact 128 can be displayed. In another example, the user can cause a mouse cursor (or other selection tool) to hover over a contact 128. This can cause a pop-up bubble containing additional information about the contact 128 to be displayed.

The conversation list 124 can display a list of recent communications between the user and the sender 112 or involving the user and the sender 112. The communications displayed on the conversation list 124 can be a list of past e-mails, text messages, instant messages, telephone calls, social network communications, message board posts or voice over IP communications involving the sender 112. In some implementations, the conversation list 124 can be a list of recent conversation threads involving the sender 112. A conversation thread is a series of communications that can be grouped together. For example, a series of e-mails having the same or similar subjects can be grouped together as a conversation thread. In another example, a group of instant messages between the sender 112 and the user that occurred over a specific period of time can be grouped together as a conversation thread. For example, if the user sent and received a series of instant messages from the sender 112 over a three hour period earlier in the day, and that conversation was separated from another series of instant messages between the user and the sender 112 by a period of 2 hours, the instant messages that were sent and received during that three hour period can be grouped together as a conversation thread. In another example, a series of telephone calls between the user and the sender 112 that occurred during a set time period can be grouped together as a conversation thread.

The communications or conversation threads displayed in the conversation list 124 can be listed in order based on a ranking system. In one implementation, conversation threads can be listed in order of most recent communications to oldest communications. In some implementations, conversation threads can be listed in order of oldest to most recent. In some implementations, conversation threads can be listed in order of importance with conversation threads containing communications marked as urgent being ranked higher than conversation threads with fewer communications marked urgent or no communications marked urgent. In some implementations, the system 100 can determine which conversation threads are work related and which conversation threads are social. The conversation threads that are work related can then be ranked higher than the conversation threads that are social. In some implementations, conversation threads can be ranked based on the number of communications in the conversation thread.

Communications that are listed in the conversation list can include communications initiated by the sender 112, communications for which the sender 112 is a recipient, communications on which the sender 112 has been copied, or communications in which the sender 112 is mentioned.

In the example depicted in FIG. 1A, the conversation list 124 displays a list of recent conversation threads involving the user and the sender 112. The conversation threads displayed are for recent e-mail communications involving the user and the sender 112. The e-mails in each conversation thread are grouped by subject. The conversation list 124 displays the subject for each conversation thread, the number of e-mails in each conversation thread, and the amount of time that has passed since the last communication for this conversation thread was sent or received. In some implementations, additional information can be displayed for each conversation thread, including: time and date of the last communication in the conversation thread, time and date of the first communication in the conversation thread, other contacts involved in the conversation thread, average length of communications in the conversation thread, total number of people involved in the conversation thread, level of importance of the communications in the conversation thread, attachments shared in the conversation thread, calendar events related to the conversation thread, other forms of communication related to the conversation thread, relevant web data, or average response time of communications in the conversation thread.

In some implementations, the conversation list 124 can display a summary or the first few lines of the most recent communication for each conversation list. In some implementations, the conversation list 124 can display a summary or the first few lines of the first communication for each conversation list. In some implementations, the conversation list 124 can display a summary or the first few lines of the last communication initiated by the sender 112 for each conversation list.

The files exchanged list 126 displays a list of files that were attached to communications involving the user and the sender 112. This can include communications initiated by the user for which the sender 112 was a recipient, communications initiated by the sender 112 for which the user was a recipient, or communications initiated by a third party for which the sender 112 and the user were both recipients. The files exchanged list 126 can also include files that were exchanged between the user and the sender 112 without using a communication medium. For example, the files exchanged list 126 can include files that were transferred from the sender 112's network drive to the user's computer or network drive. In another example, the files exchanged list 126 can include files that were transferred to the user's computer or network drive from an external hard drive, flash drive, or floppy disk belonging to or populated by the sender 112.

The files displayed in the files exchanged list 126 can be listed in order based on a ranking system. In one implementation, files can be listed in order of most recently received files to least recently received files. In some implementations, files can be listed in order of oldest to most recent. In some implementations, files can be listed in order of importance, with files that were attached to communications marked as urgent being ranked higher than files attached to communications that were not marked as urgent. In some implementations, the system 100 can determine which files are work related and which files are personal. The files that are work related can then be ranked higher than the files that are personal. In some implementations, files can be ranked based on the size of the files.

In some implementations, files can be ranked in order of most recently modified to least recently modified. In some implementations, files can be ranked based on creation date of the files. In some implementations, files can be ranked based on the authors of the files. In some implementations, files can be ranked based on recent activity of communication threads associated with the files. For example, a first file that was sent as an attachment to a communication in a communication thread for which the most recent communication occurred today can be ranked higher than a second file that was sent as an attachment to a communication in a communication thread for which the most recent communication occurred three days ago, even if the first file was sent before the second file.

In some implementations, the files displayed in the files exchanged list 126 can be grouped together. The files can be grouped together based on the subject of the communications to which the files were attached, file name, file title, date of the file, date of the communication, file type, or subject matter of the file. For example, if a document has undergone several rounds of revisions, the different versions of the document can be grouped together so that the different versions of the document can be easily compared to one another. In another example, a number of files about rain forests can be grouped together since they all contain related subject matter. In another example, all image files can be grouped together so that they can be more easily viewed, or easily put into a slide show. For example, a group of image files can be displayed as a slide show and each slide can contain additional information about the image being displayed, such as who sent the image, recipients of the image, the date the image was sent or received, or other information drawn from one or more communications to which the image was attached.

In some implementations, the person profile 108 can include additional information about the selected e-mail 110. The system 100 can extract information from the e-mail 110 and use this information to gather and display data from websites, search engines, or other sources of information. For example, the e-mail 110 may contain information about travel arrangements. The e-mail 110 can be an e-mail from an airline, travel agent, travel website or other source. If the e-mail 110 contains information about a flight, such as a flight number, an airline, a departure time, an arrival time, a departure city, or an arrival city, the system 100 can use this information to query search engines or travel websites for information about the flight. This information can include expected departure time, expected arrival time, expected delays, weather in the destination city, weather in the departure city, or any changes to the flight. This information can then be displayed as part of the person profile 108. This allows the user to see when changes to travel arrangements have occurred, and easily contact a travel company or airline in order to correct the situation.

In another example, the e-mail 110 can contain information about a purchase from an on-line retailer. The e-mail 110 can contain shipping information, shipping status, or order information. If the e-mail 110 contains a shipping number for the shipment of a recently purchased item, the system 100 can query a search engine or shipping web site to extract information about the current status and expected arrival of the item. This information can then be displayed as part of the person profile 108.

In another example, the e-mail 110 can contain information about an item or service that the user is interested in purchasing. The system 100 can query one or more search engines, websites, or on-line retailers to determine which retailer or website has the best price or currently has the item in stock or the service available. This information can then be displayed as part of the person profile 108.

Figure 1B:
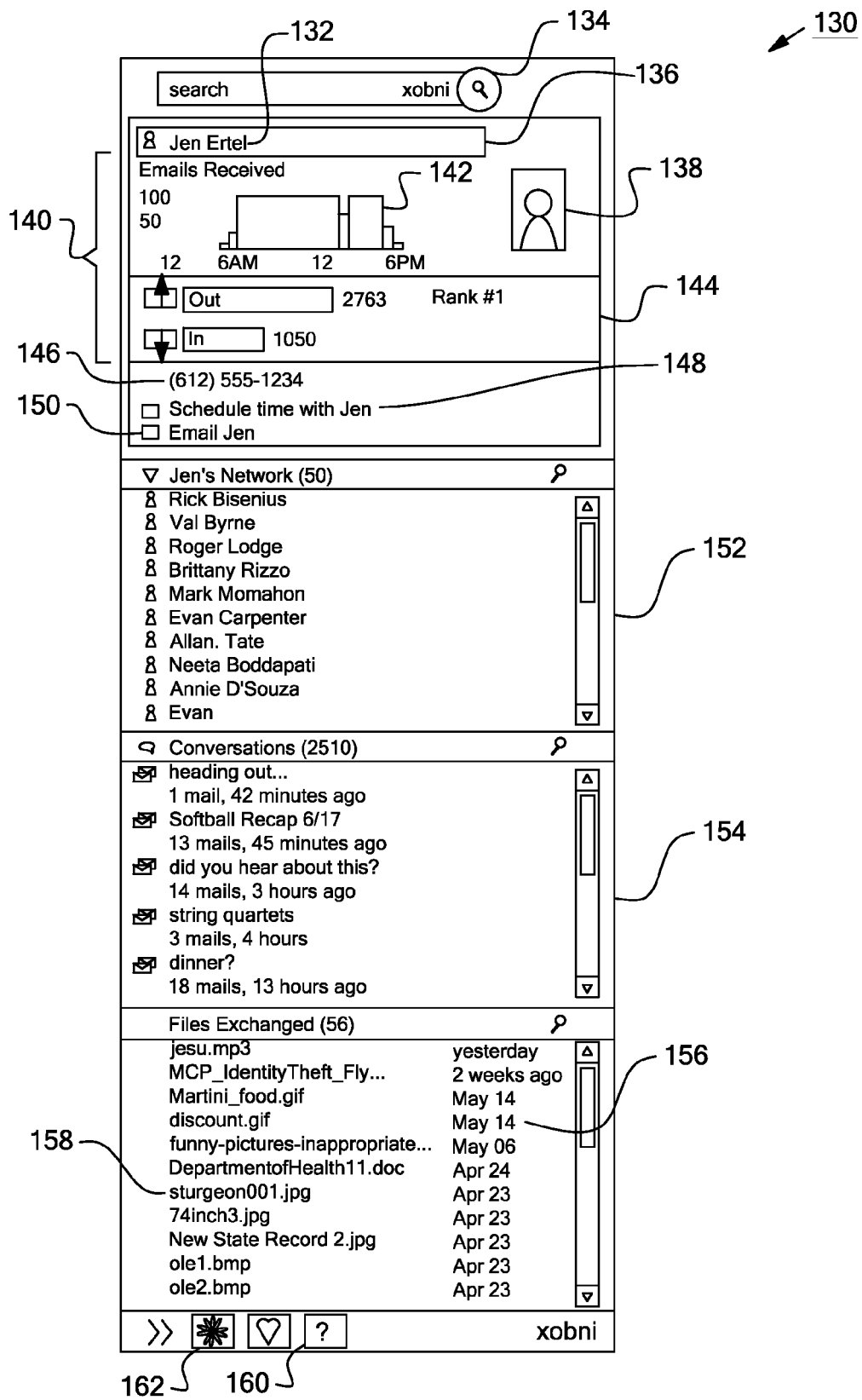
FIG. 1B shows an example of a person profile.

FIG. 1B shows a person profile 130 for a person 132 named "Jen Ertel". The person profile 130 for the person 132 can be displayed in response to an action by a user that indicates either an implicit or direct request to view the person profile 130 of the person 132. Actions by the user that can cause the person profile 130 for the person 132 to be displayed can include viewing or selecting a communication sent by the person 132, viewing or selecting a communication for which the person 132 is listed as a recipient, composing or initiating a communication with the person 132, selecting or clicking on a name, screen name, or e-mail address of the person 132, or performing a search for information related to the person 132.

The person profile 130 includes a search bar 134. The search bar 134 can be used to request that information be displayed about a particular person, topic, conversation thread, communication, or file. For example, a search performed using the search bar 134 and the search string "Allan Tate" can result in a person profile for a person named Allan Tate being displayed. In another example, a search using the search string "sunday_presentation.ppt" can result in information about a file named "sunday_presentation.ppt" being displayed. In another example, a search using the search string "2002 Sales Goals" can result in information to be displayed regarding communications with the subject "2002 Sales Goals", containing the phrase "2002 Sales Goals", or having attachments that contain the phrase "2002 Sales Goals".

Search criteria that can be used to identify a person profile can include names, screen names, social network profile names, social network profile URLs, physical addresses, website URLs, e-mail addresses, e-mail subject lines, file names, or telephone numbers. For example, a search using the search string "allan.tate@example.com" can result in a person profile for a person named "Allan Tate" being displayed. In the example depicted in FIG. 1 B, a search for the phone number "(612) 555-1243" may have been performed in-order to display the person profile 130 for the person 132 named "Jen Ertel".

The person profile 130 can include a title bar 136. The title bar 136 can display a name, a nick name, a screen name, a primary e-mail address, or other identifying title for the person 132 so that the user can easily identify who the information in the person profile 130 is related to.

The person profile 130 can also include an image 138. The image 138 can be a picture of the person 132 to help the user more easily identify who the information in the person profile 130 is related to or to help the user identify whom he or she is communicating with. For example, if the user receives an instant message from a person with the screen name "summergirl" the user may not be able to remember who this screen name belongs to. When the instant message is received, the person profile 130 can display information about the person with the screen name "summergirl" including a picture of the person as the image 138. This can help the user to identify whom he or she is communicating with. The image 138 can also be an image, icon, or picture associated with the person 132. The image, icon, or picture can be used to identify the person 132 as a business contact, co-worker, friend, social acquaintance, client, or contractor. For example, all of the person profiles 130 for contacts from a particular company can display a logo for that company. This can help the user to quickly identify what relationship he or she has with these particular contacts.

The image 138 can be added to the person profile 130 by the user, or it can be automatically extracted from a communication with the person 132 or from a website or profile page belonging to or about the person 132. For example, if a social network screen name or URL for the person 132 is known, an image from the person 132's social network profile page can be extracted and used as the image 138. In another example, if instant message communications with the person 132 include an icon that identifies the person 132, this instant message icon can be extracted and used as the image 138.

The person profile 130 can include communication statistics 140 about communications involving the person 132. These communication statistics 140 can include the statistics as previously described for FIG. 1A. In the example shown in FIG. 1B, one of the communication statistics 140 displayed is a graph 142 showing what times of day communications are received from the person 132 and the relative volume received from the person 132 at each time of day. This can help the user to determine when or how quickly the person 132 will respond to a new communication from the user. For example, if the user lives in the United States and the person 132 lives in Germany, most of the communications received from the person 132 may occur between 5:00 am and 10:00 am of the user's local time. The graph 142 can easily display this information so that the user can determine when to reasonably expect a response to a recent communication from the person 132.

Other communication statistics 140 displayed in the person profile 130 in FIG. 1B include the total number of communications received from the person 132, the total number of communications sent to the person 132, and a rank 144. The rank 144 can be the rank of the person 132 compared to all other persons that the user communicates with. The rank 144 can be based, for example, on total communications exchanged, total number of attachments exchanged, total number of communications sent, total number of communications received, length of communications or importance of communications.

Communication statistics 140 can be displayed as graphs or charts as shown in FIG. 1 B, or as text. In some implementations, statistics can be displayed in the person profile 130 or in an additional panel or pop-up window as "fun facts". For example, when viewing a person profile for someone named "Matt Miller", the person profile can display a message that reads "Matt's birthday is next week". In another example, a pop-up bubble with the message "Your last communication with Matt was 21 days ago" can be displayed. In another example, a panel can display a message reading "You send Matt 20 times as many messages as he sends you."

Another example of a fun fact that can be displayed is "Matt is your 5th most e-mailed contact". Another example of a fun fact that can be displayed is "your most e-mailed contact is Steve.'. Another example of a fun fact that can be displayed is "the fastest responder to your communications is Garrett." The fun facts can include any combination of communication statistics, communication information, contact information, or contact statistics.

In some implementations, communication statistics 140 can be shared with other persons. For example, the user can choose to share communication statistics with the person 132. The person 132 will then be able to view communication statistics 140 about his or her communications with the user. In some implementations, the user can indicate that one or more persons are trusted contacts. Communication statistics 140 can be automatically shared with all persons indicated as trusted contacts.

Other information, such as calendar information, contact information, or contact network information can also be shared with trusted contacts.

The person profile 130 can include contact information 146. The contact information 146 displayed can include e-mail addresses, telephone numbers, screen names, social network profile names, social network profile URLs, physical addresses, facsimile numbers, or website URLs. The contact information 146 can be collected from a variety of sources including communications between the person 132 and the user, communications between the user and other persons, e-mail body text, e-mail meta data, e-mail header information, e-mail attachments, web search engines, people search engines, social networks, e-mail clients, instant messages, personal web pages, telephone directories, scanned business card data, text messages, picture sharing websites, video sharing websites, personal profile pages, telephone communications, or customer relationship management systems. For example, when the user receives an e-mail from a person, that person's e-mail address can be added to the list of contact information 146 for that person's person profile 130. In another example, when the user makes a phone call to a person, that person's telephone number can be added to the list of contact information 146 for that person's person profile 130.

In some implementations, contact information 146 can be extracted from the body, subject, or meta data of a communication between the user and the person 132. For example, if the user receives an e-mail from the person 132 with a signature block at the end that includes a telephone number, facsimile number, and screen name for the person 132, this contact information can be extracted from the e-mail and added to the list of contact information 146 for the person 132's person profile 130. In another example, an e-mail from a person can include an address for the person in the body of the e-mail or in an attachment to the e-mail, this address can be extracted from the email or attachment and added to the list of contact information 146 for that person's person profile 130. In another example, the person 132 can leave a social network post for the user telling the user the person 132's instant message screen name, this screen name can be added to the list of contact information 146 for the person 132's person profile 130.

In some implementations, contact information 146 for the person 132 can be extracted from a communication from a third party. For example, the user can receive an e-mail from Bill that contains the text "Mary's cell phone number is 608-555-5353". This phone number can be extracted from Bill's e-mail and added to the list of contact information 146 for Mary's person profile 130. In another example, the user can receive an e-mail with an attachment that contains a list of telephone numbers, e-mail addresses, and office numbers for everyone in the user's office. The telephone number, e-mail address, and office number for each person listed on the attachment can be extracted and added to the list of contact information 146 for the person profiles 130 of each person listed on the attachment.

Contact information 146 can be extracted from multiple sources, including multiple e-mail clients, multiple web mail systems, multiple instant message clients, multiple telephone numbers, multiple social networks, or multiple web pages.

In some implementations, contact information 146 can be collected using search engines, telephone directories, or people search engines. Search criteria can include e-mail addresses, names, screen names, social network profile names, phone numbers, personal website URLs, social network profile URLs, facsimile numbers or physical addresses. For example, a search of a telephone directory or people search engine for "Rex Banner" can return a telephone number for Rex Banner. This telephone number can then be added to the list of contact information 146 for Rex Banner's person profile 130. In another example, a people search or web search for the e-mail address "alewis@example.com" can return a URL for a social network profile for Adam Lewis. The name "Adam Lewis" can then be associated with the e-mail address "alewis@example.com" in a person profile 130. In addition, the social network profile URL and social network screen name for Adam Lewis can be added to the list of contact information 146 for Adam Lewis's person profile 130. Furthermore, additional contact information, that is listed on the social network profile for Adam Lewis, such as additional e-mail addresses, phone numbers, instant message screen names, etc., can be extracted from the social network profile and added to the list of contact information 146 for Adam Lewis's person profile 130.

In another example, a web search or person search for a person can return a photo or video sharing website profile for the person. The URL or screen name for the person's photo or video sharing website profile can be added to the list of contact information 146 for the person's person profile 130. In addition, the photo or video sharing website may contain additional contact information for the person that can be extracted and added to the list of contact information 146 for the person's person profile 130.

In another example, contact information 146 for the person 132 can include an e-mail address "jertel@examplecompanyltd.com". A web search can be performed to identify the website associated with the e-mail extension "examplecompanyltd.com". For example, this e-mail extension can be associated with a company called "Example Company ltd." The website for Example Company ltd. can then be searched for information about the person 132. The website may include a profile page for the person 132 that includes contact information that can be added to the list of contact information 146 for the person 132's person profile 130. In addition, the URL for the profile page can be added to the list of contact information 146 for the person 132's person profile 130.

In some implementations, the address for a person can be used to refine the search results for that person by constricting the results to information about persons in a specific geographic area. For example, if a search is being performed for information on a person with a common name, such as "Bill Johnson", and Bill Johnson's address is known, the search results can be refined by restricting the results to information about person's named Bill Johnson in the city of the known address. In some implementations, other information about a person can be used to refine search results for that person.

In some implementations, contact information can be extracted from a shared network drive or through a secure connection. In some implementations, contact information can be automatically shared between systems. For example, the person 132 can elect to share contact information with all people in a trusted network, such as all people with e-mail extensions from the same company. A computer belonging to the person 132 can then automatically send contact information to all trusted people. If the user is in the network of trusted people, the person 132's contact information will automatically be shared with a computer or system belonging to the user.

In some implementations, contact information for the person 132 can be manually added or removed from the person profile 130 by the user. In some implementations, contact information for the person 132 can be manually added or removed from the person profile by the person 132 or by a third party. In some implementations, the user can choose which contact information for each person is displayed in that person's person profile.

In some implementations, when a mouse cursor or other selection tool is hovered over/indicates a piece of contact information in the list of contact information 146, a pop-up bubble or other indicator can be displayed which indicates the source from which the piece of contact information was received or extracted. For example, if a phone number has been extracted from an e-mail, a hover bubble can be displayed which shows the e-mail or a portion of the e-mail where the phone number was extracted with the extracted info highlighted or demarcated in some way.

In some implementations, the user can be allowed to validate contact information in the list of contact information 146. Validated contact information can be indicated as validated, and un-validated contact information can be indicated as un-validated. For example, if a phone number for the person 132 is extracted from an email, the user can look at the phone number to determine if it is indeed the correct phone number for the person 132. If the user believes that the phone number is correct, the user can choose to validate the phone number. The phone number can then be displayed along with an indication that it has been validated, such as with a check mark icon, or text that reads "valid". If the user is unsure if the phone number is correct, or has not taken the time to validate the phone number, the phone number can be displayed with an indication that it has not been validated, such as with a question mark icon, or the text "not validated".

In some implementations, presence of the person 132 can be indicated for some or all of the contact information on the list of contact information 146. For example, an indicator next to a person's instant message screen name can indicated if the person is currently logged onto the related instant message network. In another example, an indicator next to a person's social network screen name or URL can indicate if the person is currently logged onto the related social network or if the person has made a recent update to his or her social network profile. In another example, an indicator next to a person's e-mail address can indicate if the person has put up an away message or out of the office message.

In some implementations, the person profile 130 can display information about the person 132's current location. If the person 132 is in possession of a GPS unit, GPS enabled phone, or other location detection device, the person 132 can choose to share his or her location information. There are several services that allow a person to share location information with other people. The person 132 can choose to share his or her location information with the user. The person profile 130 can then display the current location of the person 132. This location information can be displayed as an address, map coordinates, or a graphic of a map with an icon to indicate the person 132's present location.

Other information about the person 132 that can be displayed on the person profile 130 can include birthday, gender, age, job title, employer, universities attended, family information, or other biographical data. Information from Customer Relationship Management Systems (CRMs) about or related to the person 132 can also be displayed in the person profile 130. Information about calendar items or scheduled meetings related to the person 132 or related to a communication can also be displayed as part of the person profile 130.

In some implementations, information from one or more websites can be displayed as a chronological feed of information in the person profile 130. This information can be queried on the web via one or more search engines or from one or more specific websites through established associations between the person 132 and the one or more websites. For example, this information can be found by general searching, people searching, or querying websites where it has been established that the person 132 is generating content or is the subject of content on the website. Search terms for these searches can include e-mail addresses, names, screen names, social network profile names, phone numbers, personal website URLs, social network profile URLs, or physical addresses. Information that is extracted from communications with the person 132 can also be used as search criteria.

The person profile 130 can include a schedule time link 148. The user can click on/interact with the schedule time link 148 to send a communication to the person 132 to request a meeting or to send the user's schedule to the person 132. For example, clicking on the schedule time link 148 can cause an e-mail to be automatically composed that is addressed to the person 132 that contains all of the times over the course of the next week that the user is available during business hours. This schedule information can be extracted from a calendar associated with an e-mail client, web mail account, social network account, instant messaging program, telephone, personal digital assistant (PDA), or website belonging to the user or associated with the user. In addition, schedule information can be extracted from a calendar stored on a computer, network drive, or other data storage location belonging to or associated with the user. In one implementation, clicking on the schedule time link 148 can cause a communication to be sent to the person 132 requesting schedule information from the person 132.

The person profile 130 can also include one or more initiate communication links 150. In the example shown in FIG. 1B, the initiate communication link 150 displayed will cause an e-mail addressed to the person 132 to be automatically generated when it is clicked on. Other forms of communication that can be initiated using an initiate communication link 150 include telephone calls, instant messages, text messages, social network messages, social network posts, message board posts, facsimiles, or voice over IP communications. For example, the person profile 130 can include a "call Jen" link that can cause the user's cell phone to dial Jen's phone number when clicked on. In another example, the person profile 130 can include an "instant message" link that when clicked on, can cause an instant message program to automatically open and generate an instant message addressed to a screen name of the person 132.

The person profile 130 can include a contact network 152. The contact network 152 can include a list of contacts associated with the person 132. The contact network 152 can be populated using the methods previously described in the description of FIG. 1A. The person profile 130 can also display the total number of contacts associated with the person 132 in the contact network 152. In the example shown in FIG. 1B, the contact network 152 displayed in the person profile 130 indicates that there are 50 contacts in Jen's contact network 152.

Clicking on, selecting, or interacting with one or more contacts from the contact network 152 can cause one or more actions to occur. In one implementation, selecting a contact from the contact network 152 can cause a person profile for that contact to be displayed. In some implementations, selecting one or more contacts from the contact network 152 can cause a communication directed to the selected contacts to be initiated. For example, selecting three contacts from the contact network 152 can cause an e-mail addressed to the three contacts to be generated. In another example, clicking on three contacts from the contact network 152 can cause the user's telephone to initiate a conference call with the selected contacts. In some implementations, selecting one or more contacts from the contact list can cause a communication directed to the selected contacts and the person 132 to be generated.

In some implementations, selecting a contact from the contact network 152 can cause the most recent communication or conversation thread between the user and the selected contact to be displayed. In some implementations, selecting a contact from the contact network 152 can cause the most recent communication or conversation thread involving the contact, the person 132, and the user to be displayed. In some implementations, moving a mouse cursor over a contact in the contact network 152 can cause information about the contact to be displayed. For example, moving a cursor over a contact can cause a small pop-up bubble to appear that displays the contact's phone number, e-mail address, or other contact information. In some implementations, contacts can be manually added or removed from the contact network 152 by the user.

The person profile 130 can include a conversation list 154 that includes a list of recent communications or conversation threads involving the user and the person 132 as previously described in the description of FIG. 1A. The conversation list 154 can display the total number of communications or conversation threads involving the user and the person 132. In the example shown in FIG. 1B, the conversation list 154 indicates that 2510 conversation threads have occurred that involved the user and the person 132.

Clicking on or selecting a conversation thread or communication in the conversation list 154 can cause a more detailed summary of the conversation thread or communication to be displayed. For example, selecting a conversation thread can cause a summary of one or more communications in the conversation thread to be displayed. In another example, selecting a communication in the conversation list 154 can cause a summary of the communication to be displayed. In some implementations, selecting a communication in the conversation list 154 can cause the communication to be displayed. For example, selecting an e-mail from the conversation list 154 can cause the e-mail to be displayed.

In some implementations, selecting a conversation thread can cause the most recent communication to be received or the most recent communication to be sent in that conversation thread to be displayed. In some implementations, selecting a conversation thread in the conversation list 154 can cause the first communication in that conversation thread to be displayed. In some implementations, selecting a conversation thread from the conversation list 154 can cause a communication addressed to all of the participants of the conversation thread to be generated. For example, selecting an e-mail conversation thread can cause an e-mail to be automatically generated that is addressed to all of the e-mail addresses involved with the selected conversation thread. In some implementations, communications or conversation threads can be manually added or removed from the conversations list 154 by the user.

The person profile 130 can include a files exchanged list 156. The files exchanged list 156 can contain a list of files exchanged between the user and the person 132 as previously described in the description of FIG. 1A. For each file listed in the files exchanged list 156, the person profile 130 can display a file name, a file title, an icon, the time or date when the file was received, the amount of time that has elapsed since the file was received, the subject of the communication to which the file was attached, or other information about the file. Icons displayed next to a file name or file title can indicate what type of document the file is. In the example depicted, a file 158 with the file name "sturgeon 001 .jpg" is displayed. An icon next to the file name for the file 158 indicates that the file 158 is a picture file. A date next to the file name indicates that the file 158 was received on April 23.

Clicking on or selecting a file in the files exchanged list 156 can cause the file to open. In some implementations, selecting a file can cause the communication to which the file was attached to be displayed. In some implementations, selecting a file can cause a list of files with the same file name to be displayed. This allows the different versions of a document that has undergone several rounds of revisions to be reviewed and compared to each other. This list of files can include a time and date stamp for each version of the file so that the most recent revision can be easily identified. In some implementations, selecting a file can cause a summary of the file to be generated and displayed. For example, hovering a cursor over a file in the files exchanged list 156 can cause an information bubble containing the title and first few lines of the file to be displayed. In some implementations, files can be copied from the files exchanged list 156 to other locations. In some implementations, files can be manually added or removed from the files exchanged list by the user.

The person profile 130 can include one or more menu buttons 160. The menu buttons can be used to change personal settings or preferences, change viewing preferences, or access menus or help information. The person profile 130 can also include a minimize button 162 that can cause the person profile 130 to minimize or close. When the minimize button 162 is clicked or selected, a minimized version of the person profile 130 that takes up less space in a viewing window can be displayed. The minimized version of the person profile 130 can include a summary of some or all of the information displayed by the person profile 130.

Figure 1C:
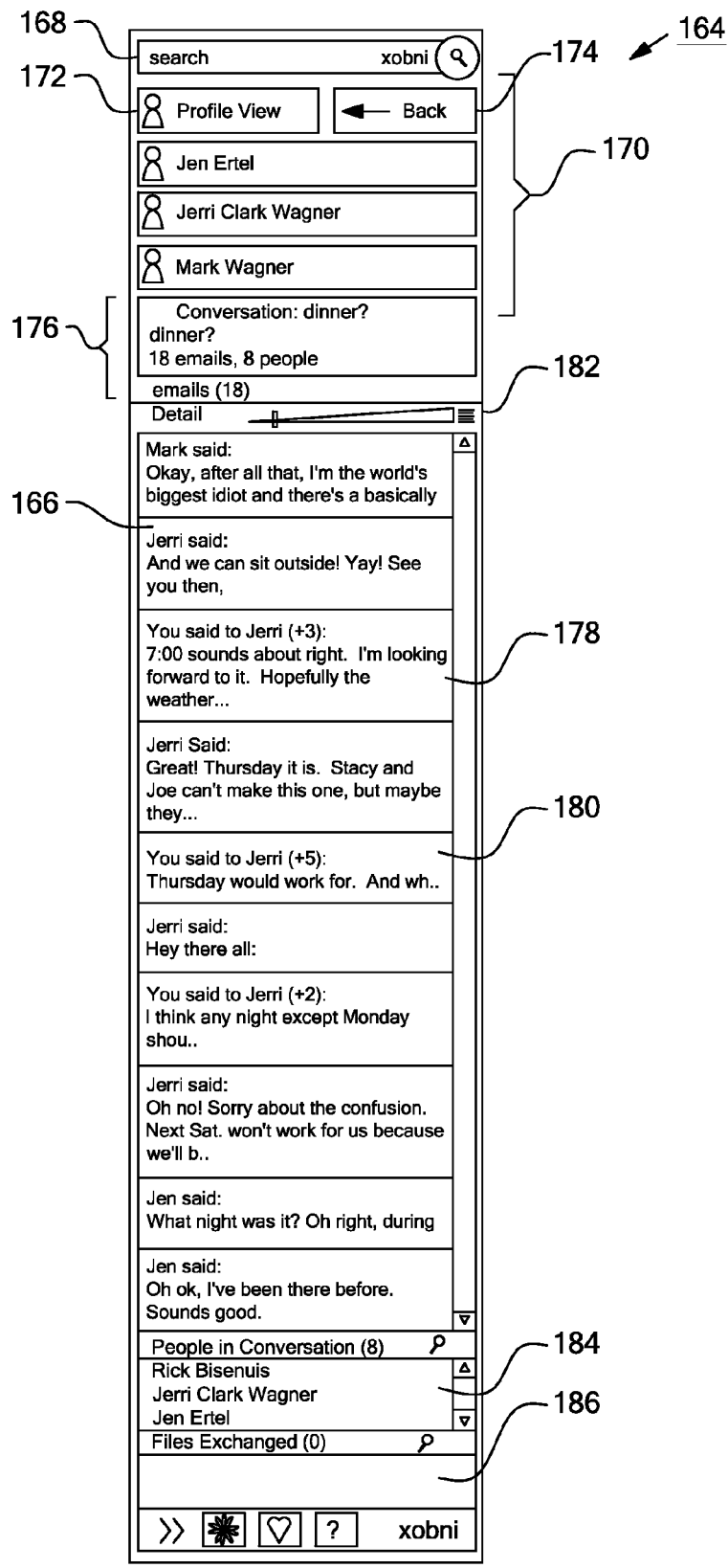
FIG. 1C shows an example of a conversation thread profile.

FIG. 1C shows a viewing panel 164. The viewing panel 164 can display a person profile such as the person profile 130 of FIG. 1B. The viewing panel 164 can also display information about communications, communication attachments, files, or conversation threads. In the example shown in FIG. 1C the viewing panel 164 displays information about a conversation thread 166. The information about the conversation thread 166 can be displayed in response to a user clicking on a conversation thread 166 in a conversation list, such as the conversation list 154 from FIG. 1 B. The conversation thread 166 can also be displayed in response to the user viewing, reading, selecting, opening, or writing a communication that is part of the currently displayed conversation thread 166. In some implementations, the conversation thread 166 can be displayed in response to a search performed by the user. For example, the user can use a search bar 168 to search for a conversation thread 166 based on the subject of the conversation thread 166, participants in the conversation thread 166, files attached to communications in the conversation thread 166, or key words or terms in the communications of the conversation thread 166.

The viewing panel 164 can include one or more navigation buttons 170. The navigation buttons 170 can include a profile view navigation button 172. The profile view navigation button 172 can be used to return the viewing panel 164 to a profile view so that the viewing panel 164 displays information about the sender or recipient of a currently selected communication, or another person as indicated by the user. The navigation buttons 170 can also include a back button 174. The back button 174 can be used to display a person profile, conversation thread, or other information that was previously displayed in the viewing panel 164. For example, if the user was previously viewing a person profile for a person named Mark Wagner, clicking on the back button 174 can cause the viewing panel 164 to display the person profile for Mark Wagner. In another example, if the user was previously viewing information about an e-mail attachment, clicking on the back button 174 can cause the viewing panel 164 to display the previously viewed e-mail attachment information.

The navigation buttons 170 can also display a navigation history that has lead to the current information being displayed in the viewing panel 164. In the example shown in FIG. 1C, the navigation buttons 170 indicate that the user first viewed a person profile for Jen Ertel. The user then viewed a person profile for Jerri Clark Wagner. The user may have opened the person profile for Jerri Clark Wagner by clicking on the name Jerri Clark Wagner in a contact network or list of contacts on Jen Ertel's person profile, or by performing a search for Jerri Clark Wagner, or other information associated with Jerri Clark Wagner. The navigation buttons 170 indicate that the user then viewed a person profile for Mark Wagner. The user may have caused the current conversation thread 166 to be displayed by clicking on a conversation thread in a conversation list similar to the conversation list 124 from FIG. 1A. In some implementations, clicking on or selecting any of the buttons in the navigation history can cause the viewing panel 164 to display the person profile, conversation thread, communication, communication attachment, or other information associated with the selected navigation button 170.

The viewing panel 164 can include a title bar 176. The title bar 176 can include the type of information being displayed in the viewing panel, the subject, and other key information. When the information being displayed in the viewing panel 164 is a conversation thread 166, the title bar 176 can indicate that a conversation is being viewed, the title or subject line of the conversation thread, the number of communications involved in the conversation thread, the types of communications involved in the conversation thread, or the number of people involved in the conversation thread. In the example shown, the title bar 176 indicates that a conversation is being viewed, that the subject line of the communications in the conversation thread 166 is "dinner?", that there are 8 people involved in conversation thread 166, that 18 communications are included in the conversation thread 166, and that all 18 communications are e-mails.

The viewing panel 164 can include a summary of some or all of the communications 178 that make up the conversation thread 166. Information displayed as part of the summary for each communication 178 can include the sender of the communication 178, the recipients of the communication 178, the time or day that the communication 178 was sent or received, attachments to the communication 178, the first few lines or sentences of the communication 178, the importance of the communication 178, or the number of recipients of the communication 178. For example, an e-mail summary 180 indicates that the user sent an e-mail in response to an e-mail from Jerri 1 week ago and that 5 additional recipients were also listed on the e-mail. The e-mail summary 180 also displays the first lines of the e-mail sent to Jerri.

In some implementations, clicking on or selecting a communication summary in the conversation thread 166 can cause the related communication to be displayed. For example, clicking on the e-mail summary 180 can cause the e-mail sent from the user to Jerri to be displayed. In another example, selecting a communication summary in the conversation thread 166 can cause a person profile for the sender or one or more recipients of the related communication to be displayed. In another example, selecting a communication summary in the conversation thread 166 can cause one or more attachments or a list of attachments to the related communication to be displayed. In some implementations, selecting a communication summary in the conversation thread 166 can cause a communication addressed to the sender or one or more recipients of the related communication to be automatically generated. In some implementations, selecting a communication summary in the conversation thread 166 can cause a more detailed summary for the related communication to be displayed.

The viewing panel 164 can include a detail adjustment control 182. the detail adjustment control 182 can be used to modify the amount of detail that is displayed in each communication summary in the conversation list 166. In one implementation, adjusting the detail adjustment control 182 can increase or decrease the number of words or lines of a body of a communication that are displayed in each communication summary. In some implementations, adjusting the detail adjustment control 182 can increase or decrease the amount of information that is displayed for each communication summary. For example, the detail adjustment control can be changed to display an e-mail address and phone number for each sender or recipient of each communication 178 in the corresponding communication summary. In another example, the detail adjustment control 182 can be used to control what information is used to identify senders or recipients of communications 178 in each communication summary. Information used to identify senders or recipients can include names, nick names, screen names, e-mail addresses, telephone numbers, social network profile names, or company names.

In some implementations in which some or all of the communications that make up a conversation thread 166 are telephone calls or voice over IP communications, audio recordings of some or all of the telephone calls or voice over IP communications can be displayed in the conversation thread 166. Clicking on or selecting a telephone call or voice over IP communication in the conversation thread 166 can cause an audio recording of the communication to play. In some implementations, automatically or manually created transcripts of telephone calls or voice over IP communications that make up part or all of a conversation thread 166 can be displayed. In some implementations, a summary of a transcript of the audio communication can be displayed as part of a communication summary in the conversation thread 166. Clicking on or selecting a communication summary of a telephone call or voice over IP communication for which a transcript exists can cause the full transcript of the audio communication to be displayed, or an audio file of the audio communication to play.

The viewing panel 164 can include a conversation participants list 184. The conversation participants list 184 can be a list of senders and recipients of the communications 178 that make up the conversation thread 166. Information about each participant in the conversation thread 166 can be displayed, including name, contact information, number of communications initiated in the displayed conversation thread 166, and other relevant information. The conversation participants list 184 can also indicate the total number of participants involved in the conversation thread 166.

In some implementations, clicking on or selecting a person listed in the conversation participants list 184 can cause a person profile for the selected person to be displayed. In some implementations, selecting a person from the conversation participants list 184 can automatically generate a communication addressed to the selected person. In some implementations, selecting a person from the conversation Participants list 184 can cause all communications or summaries of communications from the current conversation thread 166 that were initiated by the selected person to be displayed.

The viewing panel 164 can include a files exchanged list 186. The files exchanged list 186 can display a list of files that have been exchanged in the current conversation thread 166. For example, the files exchanged list 186 can list all of the files that have been attached to communications 178 in the conversation thread 166. Clicking on or selecting a file from the files exchanged list 186 can cause the selected file to open. In some implementations, selecting a file from the files exchanged list 186 can cause one or more communications to which the file was attached to be displayed. In some implementations, selecting a file from the files exchanged list 186 can cause one or more communication summaries for communications to which the file was attached to be displayed.

Figure 1D:
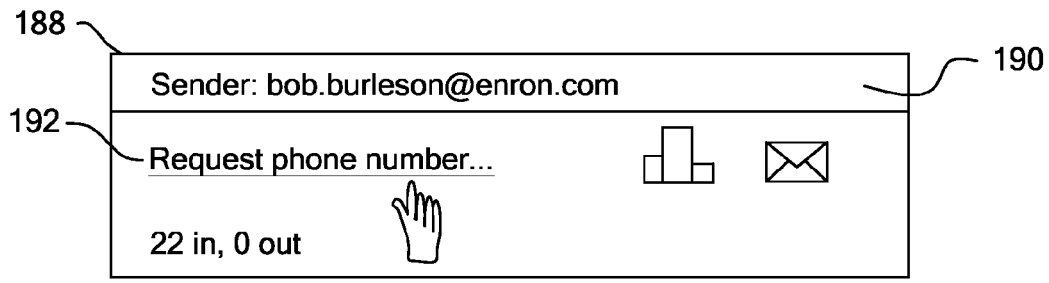
FIG. 1D shows a portion of an example person profile that can be used to request contact information.

FIG. 1D shows a portion 188 of a person profile that can be included in a person profile such as the person profile 130 in FIG. 1B. The portion 188 displays an email address 190 for a person that has had communications with a user. The portion 188 also includes a request contact information link 192. When clicked or selected, the request contact information link 192 can cause a communication addressed to the person using a known piece of contact information to be automatically generated. This automatically generated communication will request additional contact information from the person. If the person responds to the automatically generated communication, the requested contact information can be extracted from the response and displayed as part of the person profile. The extracted contact information can also be used in future communications with the person. For example, if the instant message screen name of the person is known, but the e-mail address for the person in unknown, clicking on the request contact information link 192 can automatically generate an instant message addressed to the person's known screen name with a request for the person's e-mail address. When the person responds to the automatically generated instant message with his or her e-mail address, the e-mail address can be extracted from the instant message and displayed as part of the person profile.

In the example depicted in FIG. 1D, the e-mail address 190 for the person is known, however a phone number for the person is unknown. Clicking on the request contact information link 192 can cause an e-mail addressed to the e-mail address 190 to be automatically generated with the text "Hello, I don't have your phone number. Can you please send it to me." If the person responds to the automatically generated e-mail with a phone number, the phone number can be extracted from the e-mail and displayed as part of the person profile.

In some implementations where the person responds with more than one additional piece of contact information, each additional piece of contact information can also be extracted and displayed as part of the person profile. For example, if an e-mail requesting a phone number from the person is automatically generated and sent, the person may send a response e-mail containing both a home phone number and work phone number. Both phone numbers can be extracted from the response e-mail and displayed with the work phone number and home phone number respectively indicated.

Figure 1E:
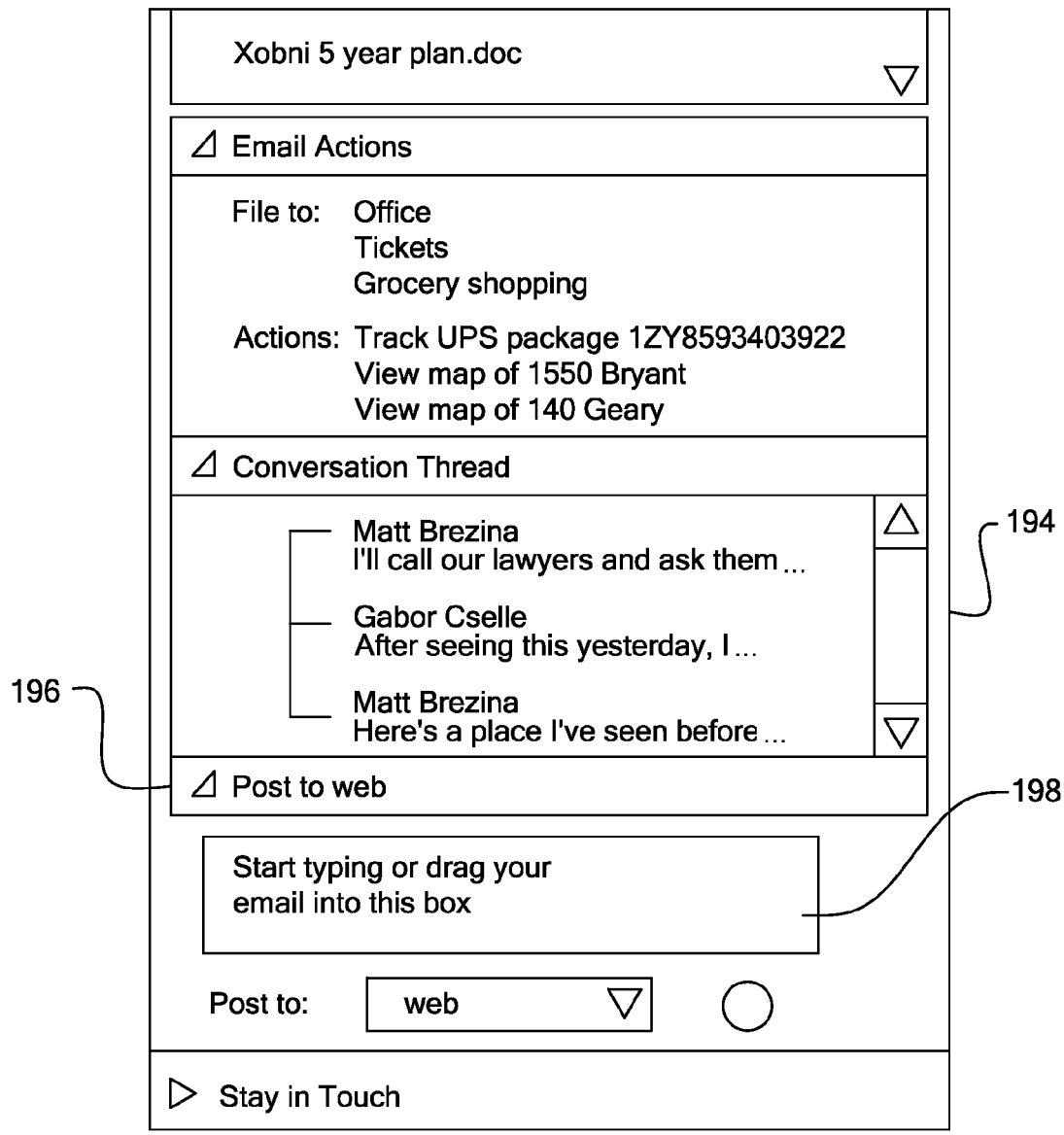
FIG. 1E shows a portion of an example person profile that can be used to post shared notes.

FIG. 1E shows a portion of a person profile 194. The person profile 194 includes a shared notes panel 196. The shared notes panel 196 can be used by a user to share information with other participants who have a relationship with the user or are known contacts of the user. Shared notes can take the form of text, documents, video files, audio files, images or hyperlinks. The user can designate which persons or contacts are permitted to view shared notes.

Posting a shared note can involve typing text or a hyperlink in a box 198 in the shared notes panel 196. One or more files can be added to the shared note by browsing for the files in a file directory and selecting the files to be attached to the shared note. In some implementations, one or more files can be added to the shared note by dragging the one or more files into the box 198. The one or more files dragged into the box 198 can include files in a folder on a computer or computer network, files that are attached to communications, files that are listed as part of a communication summary, or files that are listed in an exchanged files list.

Shared notes can be displayed as a part of a person profile and can be displayed chronologically or grouped by the type of shared note or other grouping criteria. For example, if a first person posts a shared note and a second person is on a list of contacts that are permitted to view shared notes posted by the first person, a person profile for the first person on a computer used by the second person can display the shared note from the first person as part of the person profile.

In some implementations, information shared in a shared note can be used to refine web searches. For example, a hyperlink can be sent as part of a shared note. This hyperlink can be included in a list of search results for a subject related to the topic of the shared note. Shared notes can also be used to profile a person or group of people and their interests by analyzing common sources of information and types of information commonly shared. This can be used to target adverting or recommend sources of information.

In some implementations, the shared notes panel 196 can be a panel, pop-up window, or pop-up bubble that is separate from the person profile 194. In some implementations, the shard notes panel 196 can be part of a conversation thread display. In some implementations, the shared notes panel 196 can be part of a viewing panel such as the viewing panel 164 of FIG. 1C. In some implementations, files that are shared using a shared notes system such as the one described can be stored and retrieved upon request, by for example, visiting the file location in a web browser, or when a user of the system views a person profile of a contact who shared the file.

Figure 2:
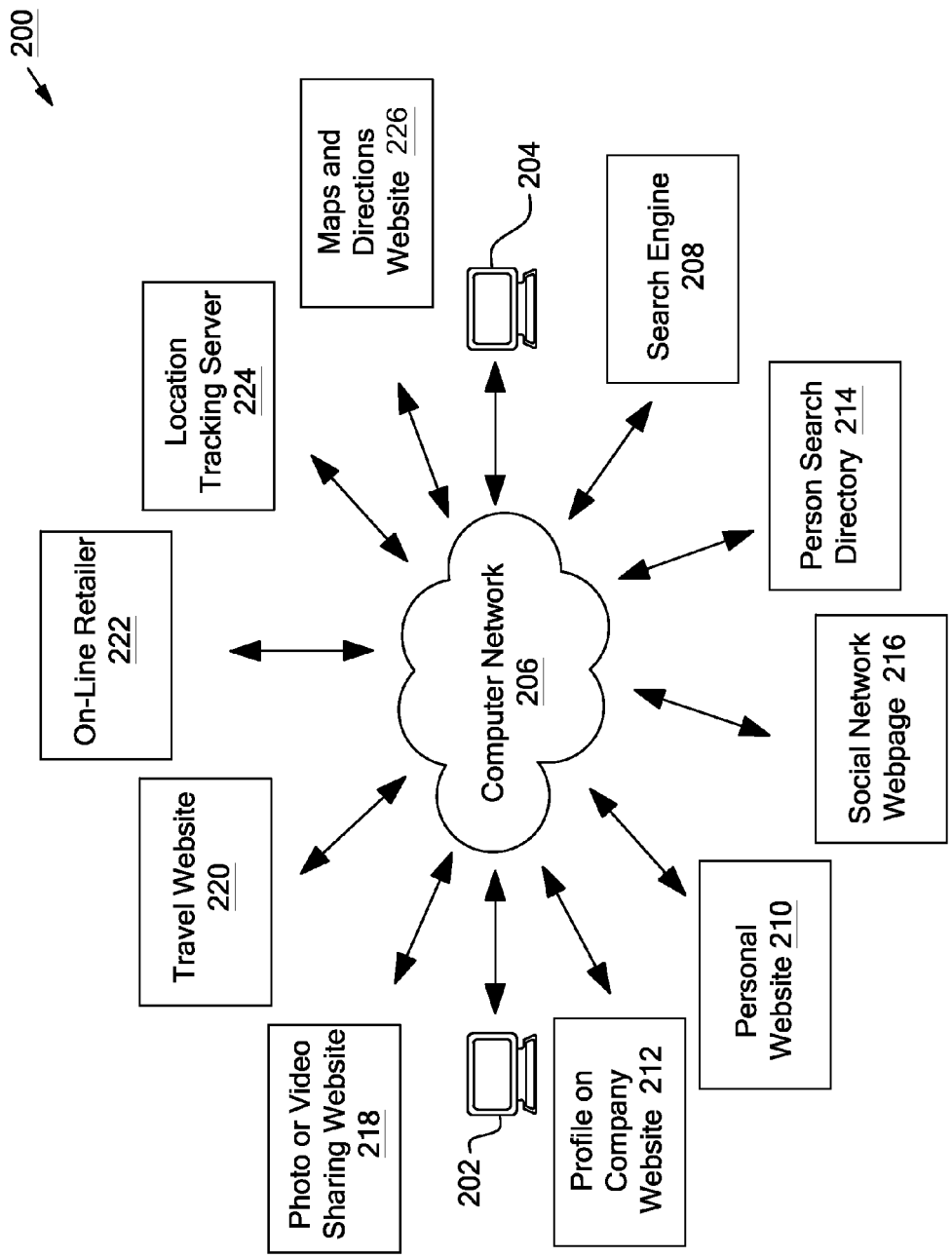
FIG. 2 is a block diagram of an example communication delivery system.

FIG. 2 shows an example communication delivery system 200. In the system 200, a first device (e.g., computer 202) belonging to a first user can transmit a communication to a second device (e.g., computer 204) belonging to a second user over a computer network 206. The computer network 206 can be the Internet, an intranet, a LAN system or a company's internal computer network. In some implementations, the computer 202 and the computer 204 can be desktop computers, laptop computers, cell phones, web enabled televisions, or personal digital assistants. The communication transmitted from the computer 202 to the computer 204 can be an e-mail, phone call, instant message, text message, social network message or comment, message board post, or voice over IP communication.

The computer 204 can extract data from the communication about the first user. This data can be used to make a person profile similar to the person profile 130 shown in FIG. 1 B. Data extracted from other communications with the first user can also be used to create a person profile for the first user. Data that is extracted from communications with the first user can be used to query websites, search engines, person search directories and other sources of information for additional information about the first user that can be used to create a person profile. Information from communications that can be used as search criteria include names, screen names, social network profile names, social network profile URLs, physical addresses, website URLs, e-mail addresses, or telephone numbers. Information that is collected as a result of these queries can be used in future searches to identify additional information that can be used to create a person profile.

For example, the computer 204 can receive an e-mail sent by the first user from the computer 202. The computer 204 can perform a search using a search engine 208 with the first user's e-mail address as the search criteria. The search engine 208 can return a search result that includes the first user's phone number. This phone number can be displayed as part of a person profile for the first user. The search engine 208 can also return the URL for or link to a personal website 210 belonging to the first user. The personal website 210 may contain additional information about the first user that can be used to create a person profile, such as additional contact information or biographical information.

In another example, the e-mail address belonging to the first user may include an extension for a company. The computer 204 can perform a search using the search engine 208 with the e-mail extension as the search criteria. A result returned by the search can be a company website. The company website can be searched to reveal a profile page 212 for the first user on the company website. The profile page 212 may contain additional information about the first user that can be used to create a person profile, such as additional contact information or biographical information.

In another example, the computer 204 can perform a search using a person search directory 214 with the first user's name or other contact information as the search criteria. The person search directory 214 can return search results with additional contact information and other information that can be used to create a person profile for the first user.

In another example, the computer 204 can receive an e-mail sent by the first user from the computer 202. The e-mail can contain a social network profile name for the first user. The computer 204 can extract this social network profile name from the e-mail and use it to access a social network webpage 216. The social network webpage 216 can contain additional contact information and other information that can be extracted and used to create a person profile for the first user. The social network webpage 216 can also contain additional contacts that can be associated with the first user in a person profile. For example, persons on the friends list of the social network webpage 216, or persons who have posted comments or messages on the social network webpage 216 can be listed as contacts in a contact network for the first user.

In another example, a search performed using the search engine 208 can return a URL or link for a photo or video sharing website 218 on which the first user has a profile. Additional contact information or biographical information that can be extracted and used to create a person profile for the first user. For example, a profile belonging to the first user on a video sharing website may include an instant message screen name for the first user. This screen name can be extracted and displayed as part of a person profile for the first user.

Information extracted from communications between the first user and second user can also be used to update profile information on a social network webpage or other webpage. For example, the computer 204 can detect that the second user system has primarily used e-mail address "david@foo.com" in recent communications, while the second user's profile on the social network webpage 216 shows his email address as "david@bar.com". The computer 204 can share the second user's new e-mail address with the social network webpage 216 and the social network can automatically update the second user's info or suggest he update it based on this changed behavior recorded by the computer 204.

Information from travel websites and on-line retailers can also be extracted and displayed as part of a person profile. For example, an e-mail containing information about a flight itinerary can be received by the computer 204. The computer 204 can extract a flight number or other information about a flight from the e-mail. The computer 204 can then query a travel website 220 using the flight number or other flight information as search criteria. Information about the flight, such as expected departure time, expected arrival time, expected delays, weather in the destination city, weather in the departure city, or any changes to the flight can be displayed as part of a person profile.

In another example, an e-mail containing information about an item or service that the second user is interested in purchasing can be received by the computer 204. The computer 204 can query one or more search engines, websites, or on-line retailers 222 to determine which retailer or website has the best price or currently has the item in stock or the service available. This information can then be displayed as part of the person profile.

Information from mapping web sites and location tracking servers can also be extracted and displayed as part of a person profile. For example, the first user can own a GPS unit, cell phone, or other device that is capable of transmitting the first user's current physical location. A location tracking server 224 can receive this transmission and allow other users to access the first user's current location information. If the second user has permission to view the location information for the first user, the computer 204 can access the location tracking server using the computer network 206 to receive location information about the first user. This location information can be displayed as part of a person profile.

The computer 204 can also access a maps and directions website 226 to create a map of the first user's current location, or to generate directions to the first user's current location. The map or directions can be displayed as part of a person profile for the first user. The maps and directions website 226 can also be used to generate a map or directions to one or more known addresses for the first user, such as a work address or home address. The map or directions can be displayed as part of a person profile for the first user.

Figure 3:
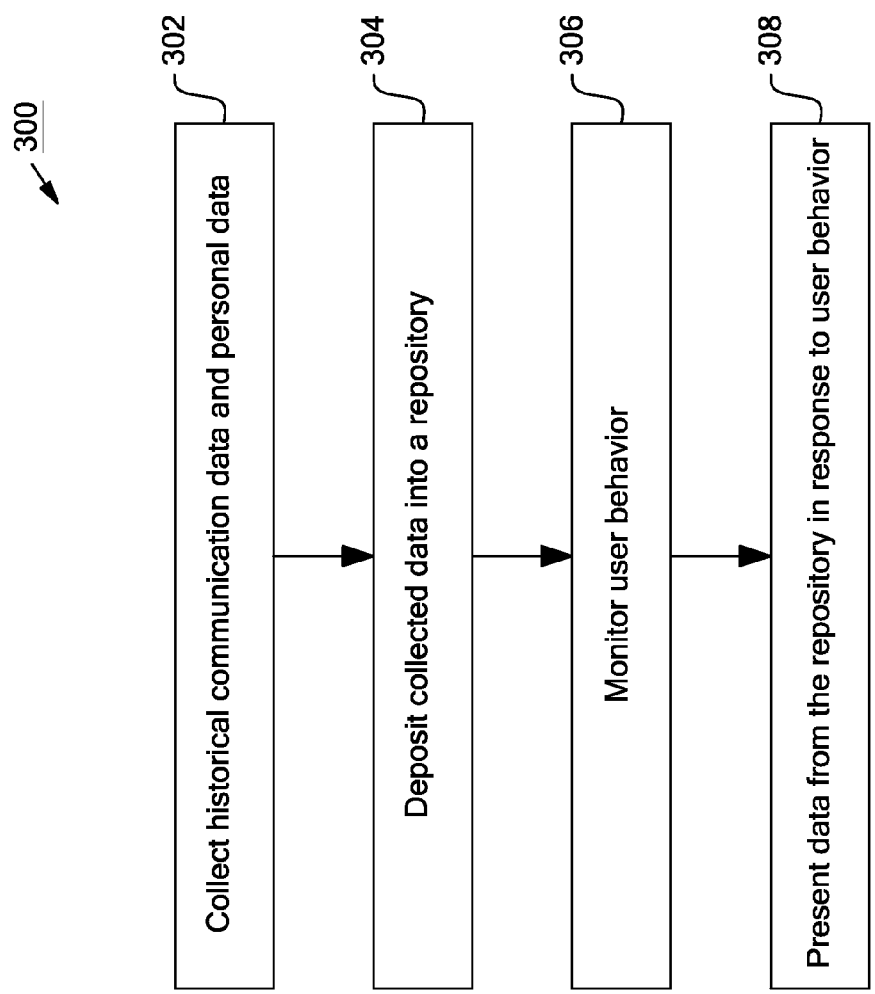
FIG. 3 is a flow diagram of an example process 300 for collecting and presenting historical communication and personal data.

FIG. 3 is a flow diagram of an example process 300 for collecting and presenting historical communication and personal data. The process 300 can, for example, be implemented in a system such as the system 100 of FIG. 1A. In another example, the process 300 can be implemented in a system such as the communication delivery system 200 of FIG. 2.

Stage 302 collects historical communication data and personal data. For example, communications such as e-mails, instant messages, phone calls, text messages, internet message board postings, social network messages or comments, or voice over IP communications can be collected. Historical communication data and personal data can also be collected from web search engines, people search engines, social networks, e-mail clients, personal web pages, telephone directories, scanned business card data, picture sharing websites, video sharing websites, personal profile pages, travel websites, on-line retailers, or customer relationship management systems.

The collected historical communication data and personal data can include contact information, biographical information, communication text, communication summaries, physical location information, mapping information, attachments to communications, weather information, travel information, and retail information.

Stage 304 deposits the collected data into a repository. For example, the collected data can be stored in a database on a user's computer. The collected data can also be stored on a network server, a web server, a removable storage device, or as part of an e-mail client or other communication client.

Stage 306 monitors user behavior. For example, a system implementing the method 300 can track the mouse movements, keyboard strokes, or mouse clicks of a user of the system, or active windows or mouse locations displayed on a monitor or other display device of the system. The user's behavior can be monitored to determine if a user has opened, viewed, read, or composed a communication, such as an e-mail. The user's behavior can also be monitored to determine if the user has performed a search, clicked on a particular item, or selected a particular item.

Stage 308 presents data from the repository in response to user behavior. For example, referring to FIG. 1A, the person profile 108 can be displayed in response to a user selecting the e-mail 110 in the inbox viewing panel 104. In another example, information about a person can be displayed in response to a user performing a search for the person's name. In another example, information about a file can be displayed in response to a user clicking on the file in an e-mail or other communication. In another example, information about a topic can be displayed in response to a user clicking on or selecting text within the body of a communication.

Links Exchanged

One embodiment provides a feature to present links exchanged between the user and one or more persons selected by the user or identified in a search.

In one embodiment, after a profile generator is installed, the profile generator indexes the data, based at least in part on the emails of the user, to generate personal profiles, as discussed above. Further, the profile generator looks for URLs inside message bodies and message subjects and stores the URLs as part of the profiles.

In one embodiment, the profile generator builds a database that identifies the URLs in the user's email, along with the associated mail message for each URL. For a given email message, the profile generator also stores the date, time, recipients of the message, and other information derived from the message. Thus, the message info can now be associated with the URLs.

In one embodiment, when the user selects an email from a person in an email program (e.g., Outlook), a profile presenter can display that person's profile, in a manner discussed above. The profile presenter can further present an ordered list of links that the user has exchanged with the person (to and from).

Figure 7:
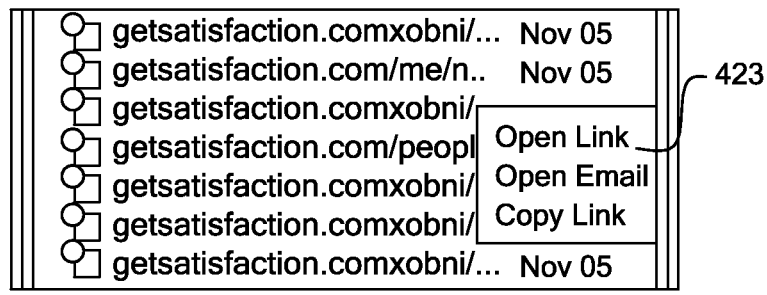
FIG. 7 shows an example of the display of a menu panel, when the user right clicks a link, to allow the user to select an operation.

In one embodiment, the links in the list are ordered by date. The user may filter the list of links via a text search, and also see what message they came from. In one embodiment, the URLs in the list are de-duplicated. Thus, each unique link is shown in the list only once. In one embodiment, from each link the user can click to view the containing message, open the link, or copy the link, as illustrated in FIG. 7 (discussed below).

In one embodiment, when the user submits a search to the profile presenter (e.g., searching a keyword), the profile presenter first finds any messages (e.g., based on headers, bodies, people) that are associated with that keyword (in a way as discussed above). The profile presenter can then display URLs that were included in the messages that are in the search result. The user does not have to type text that matches the actual link, just text that would match for the message that contains that link.

Figure 4:
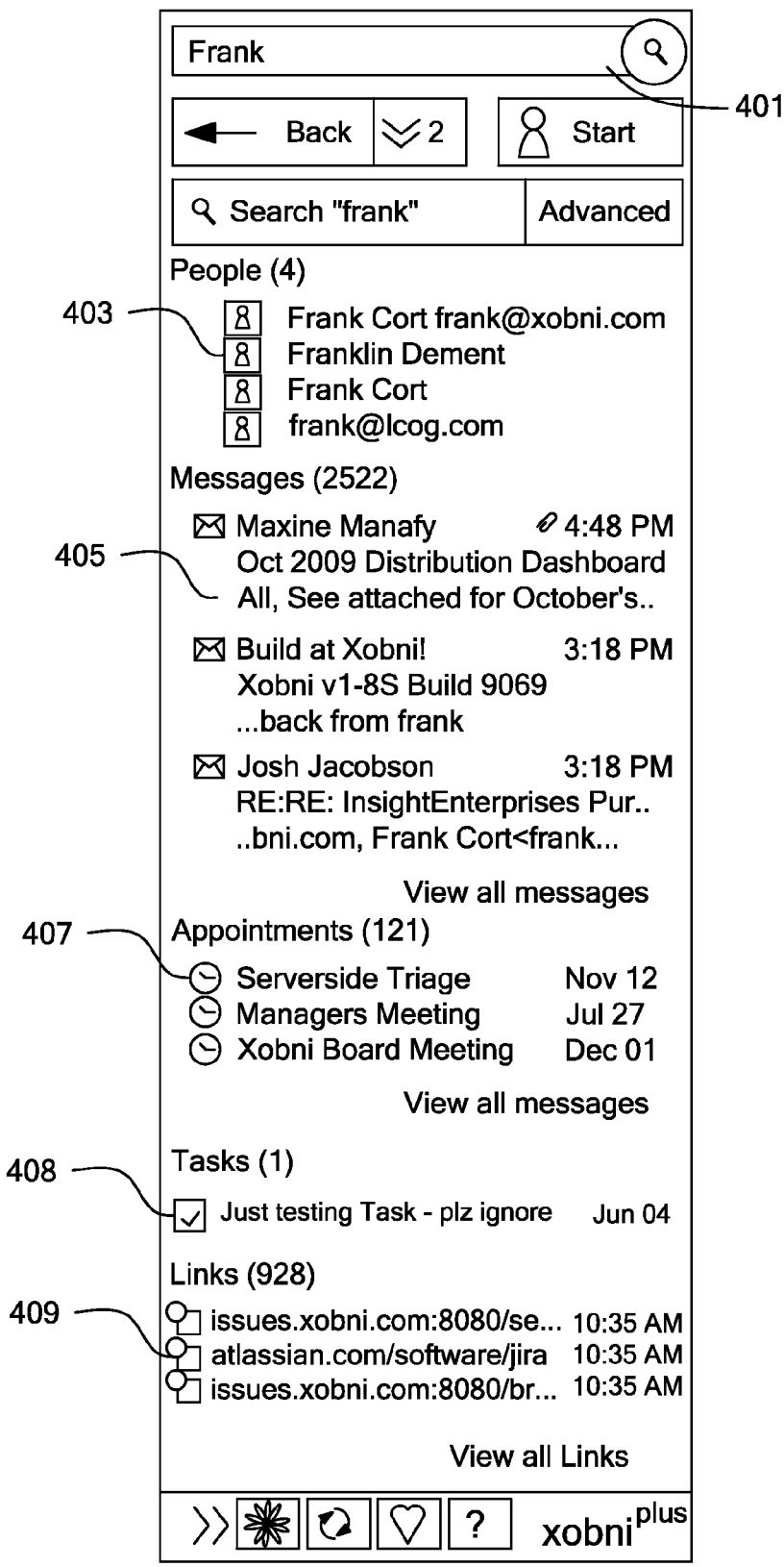
FIG. 4 shows an example of a user typing "frank" in a search box.

FIG. 4 shows an example where the user types in "frank" in the search box 401. In FIG. 4 the profile presenter lists in the "People" panel 403 a set of persons that match the keyword "frank", in the "Message" panel 405 a set of email messages that contain the keyword "frank", in the "Appointment" panel 407 a set of appointments that match the keyword "frank", and in the "Tasks" panel 408 a set of scheduled tasks that match the keyword "frank". In FIG. 4, the profile presenter provides in the "Links" panel a set of links found in the messages, appointments and tasks presented in the corresponding panels 405, 407, and 408.

Figure 5:
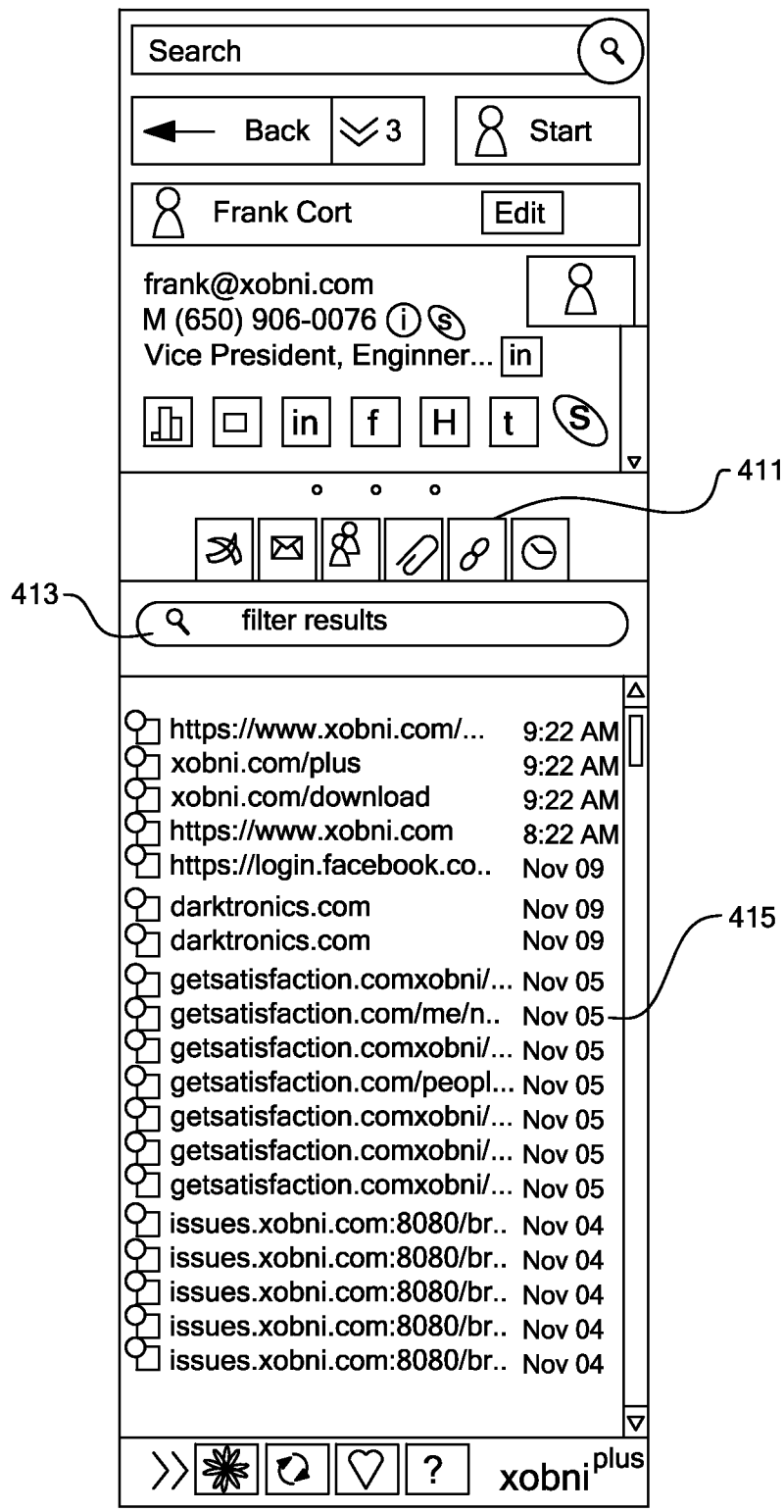
FIG. 5 shows an example of a user selecting a profile of "Frank Cort" from a "People" panel.

FIG. 5 shows an example where the user selects the profile of "Frank Cort" from the "People" panel 403. In FIG. 5, when the tab 411 is selected, an ordered list of URLs is displayed. The user may enter keywords in the filter box 413 to filter the list of URLs displayed in panel 415.

In one embodiment, the URLs in the list are ordered based on the date of the email that contains the URLs (links). In the cases of multiple emails containing the same link, the date of the most recent email is correlated with the link; and all other instances of the link are hidden.

In one embodiment, when viewing a person's profile and filtering the list of links, the filtering is based on the words in the links themselves.

Figure 6:
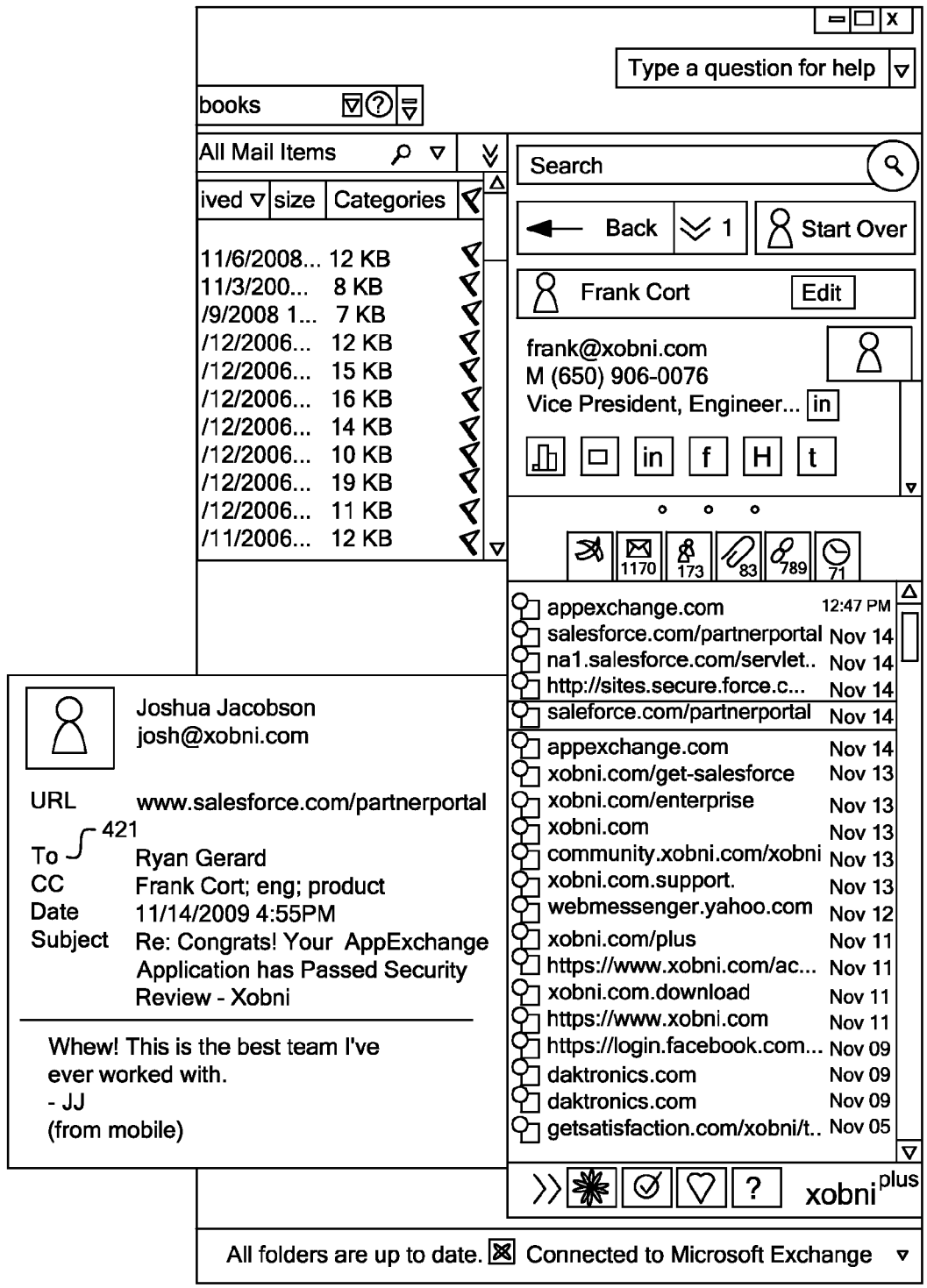
FIG. 6 shows an example of the display of further information about a link in a dynamic panel when a user causes a cursor to hover over the link.

In FIG. 5, when the user causes the cursor to hover over a link, further information about the link is displayed in a dynamic panel 421, as illustrated in FIG. 6; when the user right clicks a link, a menu panel 423 is displayed to allow the user to select an operation, such as open the link, open the email that contains the link, copy the link, as illustrated in FIG. 7.

Phone Number Recognition

In one embodiment, the profile generator has an improved capability to recognize phone numbers in the messages and correctly associate the phone numbers with people identified for the person profiles.

In one embodiment, the profile generator uses first regular expressions to identify candidates for phone numbers and then use second regular expressions to determine whether these candidates are actually data other than phone numbers.

For example, the profile generator may use a regular expression to identify strings that are numbers separated by dots (e.g., 415.425.5555). The profile generator then determines whether the candidate is more appropriately to be recognized as an IP address (e.g., 127.0.1.214).

In one embodiment, the profile generator is configured to recognize phone numbers that have predetermined characters that separate different parts of the telephone numbers, such as dots, dashes, spaces, etc. For example, the profile generator is configured to find phone numbers with dots in them, like 415.218.2322 and configured to tell IP addresses, such as 207.104.128.4 and not to display an IP address as a phone number. In one embodiment, after a string is identified as a candidate for a recognized phone number (e.g., identified via a first regular expression), the profile generator determines whether the string is an IP address (e.g., via matching against a second regular expression). For example, a regular expression can be used to check whether the string of a "potential phone number" has the following pattern: 1 to 3 digits, followed by a dot, followed by 1 to 3 digits, followed by a dot, followed by 1 to 3 digits. In some embodiments, the profile generator may be configured to check whether the string is further followed by a dot and 1-3 digits. In some embodiments, the profile generator may further checks for whether each of the parts separated by dots is an octet having a value between 0 and 255. When the "potential phone number" matches the pattern(s) for an IP address, the "potential phone number" is not accepted as a phone number.

In one embodiment, a "potential phone number" is checked against the patterns for IPv4 addresses. In some embodiments, a "potential phone number" is further checked against the patterns for IPv6 addresses.

Similarly, phone number candidates may be checked against the possibility that the candidates actually represent data and time combinations. This improves the accuracy of phone number recognition. For example, once the profile generator has found a potential phone number, the profile generator checks the potential phone number against a regular expression for a date and time combination to see whether it is an instant of date and time. In one embodiment, to check for date time combinations, the profile generator checks for the following pattern: 4 digits, followed by a dash or forward slash (/), followed by 1 or 2 digits, followed by a dash or slash, followed by one or more whitespace characters (tab, space, etc.), followed by 1 or 2 digits followed by a colon, followed by two digits, followed by a word boundary or nothing. In some embodiments, the profile generator is configured to check whether the "potential phone number" as found in a message is part of a string that represents a date and time combination to avoid presenting date and time as a phone number.

In one embodiment, the profile generates is configured to find the right owner of the phone number. For example, the profile generator may check the words preceding the potential phone number and/or following the potential phone number to determine whether these words indicate that the candidate is not a phone number, or not a phone number of a person identified in the message (e.g., sender or recipient). For example, the profile generator may check the words to the left and right of a phone number and look for words like his/her/they/them/conference/dial-in/dialin/ip/'s to determine that the phone number most likely does not belong to the person who sent the email. This helps eliminate the problem of matching up contact persons with the wrong number.

In one embodiment, the profile presenter looks for punctuation around phone numbers to find groupings of words and numbers to determine the type of number (fax, cell, etc.) and the owner.

For example, once the profile generator finds a potential phone number, the profile generator walk from the beginning of the phone number left, using a regular expression to find words that are on the current line and/or a previous line (e.g., separated by new line and/or carriage return), looking for words that are ended in a colon (e.g., on the preceding line). In one example, the message contains the following strings of words.

"My phone number is:
415 555 1212"

The profile generator detects the "colon" on the left of the phone number and thus identifies these words on the left of the phone number (e.g., "My" "phone" "number" "is") to check for indication of the owner of the phone number (and/or the type of the phone number). The profile generator may check these words for bad matches. For example, if the profile generator see "his number is" (e.g., by matching to the predetermined word "his") or "Bob's number is" (e.g., by matching to the occurrence of "'s"), the profile generator may discard the phone number, since the owner of the phone number is not the sender of the message. In one embodiment, the profile generator marches a number of predetermined words to the left of the "potential phone number" in the message against a set of predetermine words, such as "he", "she", "her", "him", "his", "her", "they", "them", "their", "its", "conference", "pin", "dial-in", "dialin", "s", "version", "ip", etc. When one of the words preceding the "potential phone number" marches to one of the predetermined words, the "potential phone number" is not taken as a phone number of the sender of the message.

In one embodiment, the profile generator also checks the words to the left and/or right of the "potential phone number" for indication of the type of the phone number. For example, the profile generator may check for words like "f", "fax", "efax", "c", "cell", "cellular", "home", "office", etc. to determine the type of the phone number (e.g., cell, fax, home, office, or main). In one embodiment, the profile generator is configured to give the "main" category a low priority. That is, if the profile generator sees a word matching "main" type and another word matching "home" type, the profile generator will mark the phone as "home".

In one example, the message contains a fragment of "425-555-1212 (office), 425-555-5656 (cel". When checking the second number (425-555-5656), the profile generator detects the comma (punctuation) on the left, and thus stop checking more words on the left, and continues to check the words on the right to find the "type" of the phone number (home, office, main, cell, etc.) In one embodiment, the profile generator is configured to test the words on the left first, and then test the words on the right to determine the type and to determine whether the phone number should be discarded.

Contact Network

In one embodiment, the profile generator identifies the persons associated with a sender (or a recipient) of a message not only based on the headers (e.g., To, CC, BCC fields of an email), but also the message bodies which may contain identifications of the associated persons, such as names, email addresses, etc. The persons referred to in the header and/or the body of the messages are considered the contact network of the sender (or recipient). The contact network can be presented as part of the profile of the sender (or recipient), as illustrated in FIG. 1B, panel 154. The person in the contact network can be sorted according to the frequency that these people (and their associated email addresses) appeared in messages common to one another.

For example, the profile generator can scan message bodies to find email addresses. So if someone forwards an email to the user with the list of email addresses in the body of the forwarded message, those email addresses can be recognized as a part of the sender's network in the user's view of sender's profile.

The apparatus, methods, flow diagrams, and structure block diagrams described in this patent document may be implemented in computer processing systems including program code comprising program instructions that are executable by the computer processing system. Some implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
    identifying, by a computing device, a plurality of links contained within a plurality of emails between a user of the computing device and a sender, wherein each of the plurality of links is exchanged with the same sender, and is a uniform resource locator that links to a website;
    determining, from a string in one of the plurality of emails, information comprising at least one of: a phone number, an Internet protocol address, an email address, a date, or a time, wherein determining the information includes analyzing one or more words preceding or following the determined information;
    storing, by the computing device, the determined information in a profile of the sender;
    collecting each of the plurality of links from a body of one or more of the plurality of emails;
    presenting, via a user interface operating in conjunction with the computing device, the profile of the sender, the profile displaying a contact network of the sender, and the profile further displaying a list of the identified links that the user has exchanged with the sender in the plurality of emails, wherein the list of identified links is different than contacts in the contact network of the sender;
    receiving a search query containing a keyword from the user;
    identifying at least two of the plurality of emails that are from the sender and contain the keyword, the keyword including text other than text matching one of the plurality of links;
    in response to identifying the emails containing the keyword, displaying an ordered list of links contained within the identified emails, the list ordered by link based on a date associated with an email from the sender containing the link, and wherein the ordered list of links is different than contacts in the contact network of the sender; and
    de-duplicating links so that each link is shown in the ordered list only once.

2. The method of claim 1, wherein the list of identified links is ordered by date.

3. The method of claim 1, further comprising:
    storing, by the computing device, an identified link in the profile of the sender;
    associating the identified link with respective information regarding the email containing the identified link in the profile; and
    displaying, via the user interface and in response to input from the user, the identified link and at least a portion of the information regarding the email from the profile.

4. The method of claim 3, wherein the profile is stored in a database.

5. The method of claim 3, wherein the input from the user includes selection, via the user interface, of an email associated with the profile.

6. The method of claim 1, wherein at least one of the emails includes multiple links.

7. The method of claim 1, wherein the user is a recipient of each of the plurality of emails.

8. The method of claim 1, further comprising:
    receiving, via the user interface, a selection of a link from the list of the identified links; and
    in response to the selection of the link, opening the link.

9. The method of claim 1, wherein determining the information further includes comparing the string to a regular expression defining a pattern of characters.

10. A non-transitory computer-readable medium storing computer readable instructions, which when executed, cause a computing device to:
    identify, by the computing device, a plurality of links contained within a plurality of emails between a user of the computing device and a sender, wherein each of the plurality of links is exchanged with the same sender, and is a uniform resource locator that links to a website;
    determine, from a string in one of the plurality of emails, information comprising at least one of: a phone number, an Internet protocol address, an email address, a date, or a time, wherein determining the information includes analyzing one or more words preceding or following the determined information;
    store, by the computing device, the determined information in a profile of the sender;
    collect each of the plurality of links from a body of one or more of the plurality of emails;
    present, via a user interface operating in conjunction with the computing device, the profile of the sender, the profile displaying a contact network of the sender, and the profile further displaying a list of the identified links that the user has exchanged with the sender in the plurality of emails, wherein the list of identified links is different than contacts in the contact network of the sender;
    receive a search query containing a keyword from the user;
    identify at least two of the plurality of emails that are from the sender and contain the keyword, the keyword including text other than text matching one of the plurality of links; and
    in response to identifying the emails containing the keyword, display an ordered list of links contained within the identified emails, the list ordered by link based on a date associated with an email from the sender containing the link, and wherein the ordered list of links is different than contacts in the contact network of the sender.

11. A system, comprising:
    a processor; and
    memory storing instructions configured to instruct the processor to:
        identify a plurality of links contained within a plurality of emails between a user of the system and a sender, wherein each of the plurality of links is exchanged with the same sender, and is a uniform resource locator that links to a website;
        determine, from a string in one of the plurality of emails, information comprising at least one of: a phone number, an Internet protocol address, an email address, a date, or a time, wherein determining the information includes analyzing one or more words preceding or following the determined information;

store the determined information in a profile of the sender;

collect each of the plurality of links from a body of one or more of the plurality of emails;

present, via a user interface, the profile of the sender, the profile displaying a contact network of the sender, and the profile further displaying an ordered list of the identified links that the user has exchanged with the sender in the plurality of emails, wherein the list of identified links is different than contacts in the contact network of the sender;

receive a search query containing a keyword from the user;

identify at least two of the plurality of emails that are from the sender and contain the keyword, the keyword including text other than text matching one of the plurality of links; and in response to identifying the emails containing the keyword, display an ordered list of links contained within the identified emails, the list ordered by link based on a date associated with an email from the sender containing the link, and wherein the ordered list of links is different than contacts in the contact network of the sender.

12. The system of claim 11, wherein the instructions are further configured to instruct the processor to de-duplicate links so that each link is shown in the ordered list only once.

* * * * *